(12) United States Patent
Ye et al.

(10) Patent No.: US 11,785,249 B2
(45) Date of Patent: **\*Oct. 10, 2023**

(54) SYSTEMS AND METHODS FOR SPATIAL PREDICTION

(71) Applicant: VID SCALE, INC., Wilmington, DE (US)

(72) Inventors: Yan Ye, San Diego, CA (US); Qian Chen, San Jose, CA (US); Jie Dong, San Diego, CA (US)

(73) Assignee: VID Scale, Inc., Wilmington, DE (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/896,350

(22) Filed: Aug. 26, 2022

(65) Prior Publication Data

US 2022/0408109 A1 Dec. 22, 2022

Related U.S. Application Data

(63) Continuation of application No. 15/458,919, filed on Mar. 14, 2017, now Pat. No. 11,432,001, which is a
(Continued)

(51) Int. Cl.
*H04N 19/52* (2014.01)
*H04N 19/119* (2014.01)
(Continued)

(52) U.S. Cl.
CPC ............ *H04N 19/52* (2014.11); *H04N 19/11* (2014.11); *H04N 19/119* (2014.11);
(Continued)

(58) Field of Classification Search
CPC ....... H04N 19/11; H04N 19/119; H04N 19/52
See application file for complete search history.

(56) References Cited

U.S. PATENT DOCUMENTS 6,654,503 B1 11/2003 Sudharsanan et al.
9,578,331 B2 2/2017 Ye et al.
(Continued)

FOREIGN PATENT DOCUMENTS

CN 1722836 A 1/2006
CN 1921630 A 2/2007
(Continued)

OTHER PUBLICATIONS

Cao et al., "Report on Short Distance Intra Prediction Method", JCTVC-E278, Apr. 2011.
(Continued)

*Primary Examiner* — Jeremiah C Hallenbeck-Huber
(74) *Attorney, Agent, or Firm* — Condo Roccia Koptiw LLP

(57) ABSTRACT

Systems, methods, and instrumentalities are disclosed relating to intra prediction of a video signal based on mode-dependent subsampling. A block of coefficients associated with a first sub block of a video block, one or more blocks of coefficients associated with one or more remaining sub blocks of the video block, and an indication of a prediction mode for the video block may be received. One or more interpolating techniques, a predicted first sub block, and the predicted sub blocks of the one or more remaining sub blocks may be determined. A reconstructed first sub block and one or more reconstructed remaining sub blocks may be generated. A reconstructed video block may be formed based on the prediction mode, the reconstructed first sub block, and the one or more reconstructed remaining sub blocks.

20 Claims, 23 Drawing Sheets

Related U.S. Application Data continuation of application No. 13/615,925, filed on Sep. 14, 2012, now Pat. No. 9,699,452.

(60) Provisional application No. 61/535,043, filed on Sep. 15, 2011.

(51) Int. Cl.

| | | |
|---|---|---|
| *H04N 19/11* | (2014.01) | |
| *H04N 19/176* | (2014.01) | |
| *H04N 19/46* | (2014.01) | |
| *H04N 19/593* | (2014.01) | |
| *H04N 19/124* | (2014.01) | |
| *H04N 19/14* | (2014.01) | |
| *H04N 19/80* | (2014.01) | |
| *H04N 19/90* | (2014.01) | |
| *H04N 19/60* | (2014.01) | |
| *H04N 19/59* | (2014.01) | |
| *H04N 19/182* | (2014.01) | |

(52) U.S. Cl.
CPC ........... *H04N 19/124* (2014.11); *H04N 19/14* (2014.11); *H04N 19/176* (2014.11); *H04N 19/182* (2014.11); *H04N 19/46* (2014.11); *H04N 19/59* (2014.11); *H04N 19/593* (2014.11); *H04N 19/649* (2014.11); *H04N 19/80* (2014.11); *H04N 19/90* (2014.11)

(56) References Cited

U.S. PATENT DOCUMENTS

| | | | |
|---|---|---|---|
| 2007/0047656 A1* | 3/2007 | Kim | H04N 19/46 375/E7.176 |
| 2008/0101707 A1 | 5/2008 | Mukherjee et al. | |
| 2008/0260027 A1 | 10/2008 | Karczewicz | |
| 2009/0010333 A1 | 1/2009 | Tourapis et al. | |
| 2009/0297053 A1 | 12/2009 | Nakamura et al. | |
| 2010/0208802 A1 | 8/2010 | Tsukuba et al. | |
| 2010/0278266 A1 | 11/2010 | Daian | |
| 2010/0290534 A1* | 11/2010 | Pandey | H04N 19/55 375/E7.026 |
| 2011/0001839 A1 | 1/2011 | Arimura et al. | |
| 2011/0150087 A1 | 6/2011 | Kim et al. | |
| 2011/0200095 A1 | 8/2011 | Kadono et al. | |
| 2011/0310969 A1* | 12/2011 | Park | H04N 19/86 375/E7.246 |

FOREIGN PATENT DOCUMENTS

| | | |
|---|---|---|
| CN | 101668205 A | 3/2010 |
| CN | 101682770 A | 3/2010 |
| JP | 2000-156868 A | 6/2000 |
| JP | 2003-204555 A | 7/2003 |
| JP | 2005-130417 A | 5/2005 |
| JP | 2006-237970 A | 9/2006 |
| JP | 2009-290498 A | 12/2009 |
| JP | 2010-034802 A | 2/2010 |
| JP | 2010-263301 A | 11/2010 |
| JP | 2011-015117 A | 1/2011 |
| TW | I287403 B | 9/2007 |
| TW | 200850009 A | 12/2008 |
| TW | 201036447 A | 10/2010 |
| WO | 2006/004331 A1 | 1/2006 |
| WO | 2009/004985 A1 | 1/2009 |
| WO | 2011/108240 A1 | 9/2011 |

OTHER PUBLICATIONS

Choi et al., "H.264/AVC based Near Lossless Intra Codec Using Line-Based Prediction and Modified CABAC", Multimedia and Expo (ICME), 2011 IEEE International Conference, Jul. 11-15, 2011, 5 pages.

ITU-T, "Advanced Video Coding for Generic Audiovisual Services", H.264, Series H: Audiovisual and Multimedia Systems, Infrastructure of Audiovisual Services—Coding of Moving Video, Nov. 2007, 564 pages.

Kanumuri et al., "Enhancements to Intra Coding", JCTVC-D235, DoCoMo Communications Laboratories USA, Inc. & NTT DoCoMo, Inc., Joint Collaborative Team on Video Coding (JCT-VC) of ITU-T SG 16 WP 3 and ISO/IEC JTC 1/SC 29/WG 11, 4th Meeting: Daegu, KR, Jan. 20-28, 2011, pp. 1-7.

Lai, "TE 6.a: HiSilicon Report on Short Distance Intra Prediction", JCTVC-C101, HiSilicon Technologies Co., Ltd., Joint Collaborative Team on Video Coding (JCT-VC) of ITU-T SG16 WP3 and ISO/IEC JTC1/SC29/WG11, 3rd Meeting: Guangzhou, China, Oct. 7-15, 2010, pp. 1-2.

Lee et al., "A Novel Coding Schemem for Intra Pictures of H.264/avc", 28th Picture Coding Symposium, PCS2010, Nagoya, Japan, Dec. 8-10, 2010, pp. 62-65.

McCann et al., "HEVC Test Model 3 (HM 3) Encoder Description", JCTVC-E602, Apr. 2011.

Peng et al., "TE6.a: Report of Line-Based Coding", JCTVC-C270, Oct. 2010.

Piao et al., "An Adaptive Divide-and-Predict Coding for Intra-Frame of H.264/AVC", Image Processing (ICIP), 2009 16th IEEE International Conference, Nov. 7-10, 2009, pp. 3421-3424.

Sikora et al., "Shape-Adaptive DCT for Generic Coding of Video", IEEE Transactions on Circuits and Systems for Video Technology, vol. 5, No. 1, Feb. 1995, 4 pages.

SMPTE, "VC-1 Compressed Video Bitstream Format and Decoding Process—Amendment 1", Amendment 1-2007 to SMPTE 421M-2006, Nov. 29, 2007, 5 pages.

Sullivan et al., "Rate-Distortion Optimization for Video Compression", IEEE Signal Processing Magazine, vol. 15, Issue 6, Nov. 1998, pp. 74-90.

Tan et al., "Intra-Prediction with Adaptive Sub-Sampling", JCTVC-B025, Institute for Infocomm Research, Joint Collaborative Team on Video Coding (JCT-VC) of ITU-T SG16 WP3 and ISO/IEC JTC1/SC29/WG11, 2nd Meeting: Geneva, CH, Jul. 21-28, 2010, pp. 1-4.

Tourapis et al., "H.264/14496-10 AVC Reference Software Manual", JVT-AE010, Dolby Laboratories Inc., Fraunhofer-Institute HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 90 pages.

Wiegand et al., "WD3: Working Draft 3 of High-Efficiency Video Coding", JCTVC-E603, Editor, Joint Collaborative Team on Video Coding (JCT-VC) of ITU-T SG16 WP3 and ISO/IEC JTC1/SC29/WG11, 5th Meeting: Geneva, CH, Mar. 16-23, 2011, 217 pages.

Wu et al., "Description of Video Coding Technology Proposal by Microsoft", JCTVC-A118, Microsoft Research Asia, Joint Collaborative Team on Video Coding (JCT-VC) of ITU-T SG16 WP3 and ISO/IEC JTC1/SC29/WG11, 1st Meeting: Dresden, DE, Apr. 15-23, 2010, pp. 1-15.

Yamamoto et al., "A New Intra Mode Using Down-Sampled Macroblock", ITU-T, Sharp Corporation, VCEG-AE12, Study Group 16 Question 6, Video Coding Experts Group (VCEG), 31st Meeting: Marrakech, MA, Jan. 15-16, 2007, 3 pages.

CN 101668205 A, Office Action dated Jun. 19, 2018, in Taiwanese Patent Application No. 105130227.

JP 2000-156868 A, Office Action dated Jul. 26, 2016, in Japanese Patent Application No. 2014-530812.

JP 2003-204555 A, Office Action dated Feb. 21, 2017, in Japanese Patent Application No. 2014-530812.

JP 2005-130417 A, Office Action dated Jul. 26, 2016, in Japanese Patent Application No. 2014-530812.

JP 2006-237970 A, Office Action dated Feb. 21, 2017, in Japanese Patent Application No. 2014-530812.

JP 2010-034802 A, Office Action dated Jul. 26, 2016, in Japanese Patent Application No. 2014-530812.

TW 201036447 A, Office Action dated Oct. 31, 2018, in Taiwanese Patent Application No. 105130227.

(56) References Cited

OTHER PUBLICATIONS

WO 2011/108240 A1, Office Action dated Jul. 26, 2016, in Japanese Patent Application No. 2014-530812.

* cited by examiner

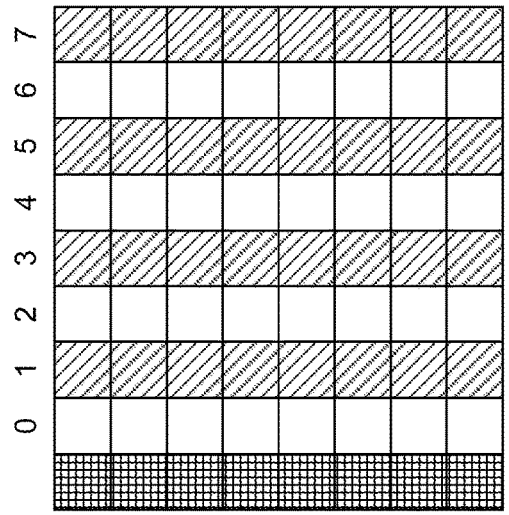
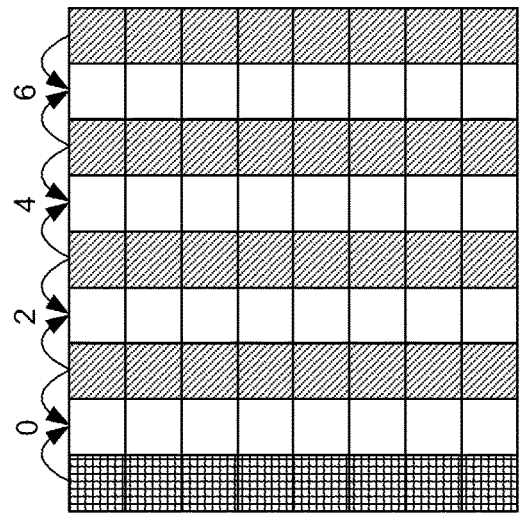
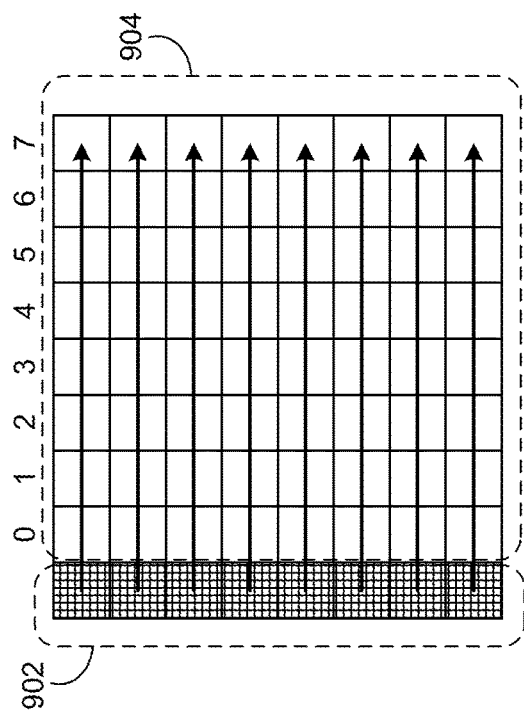
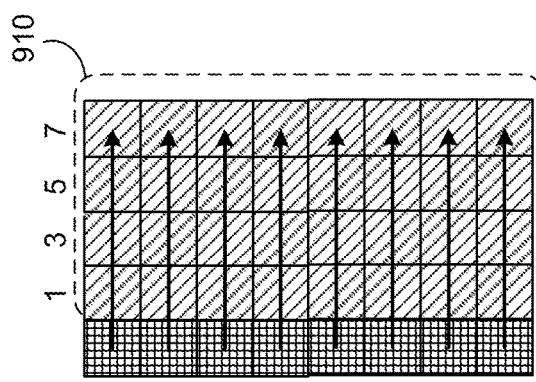

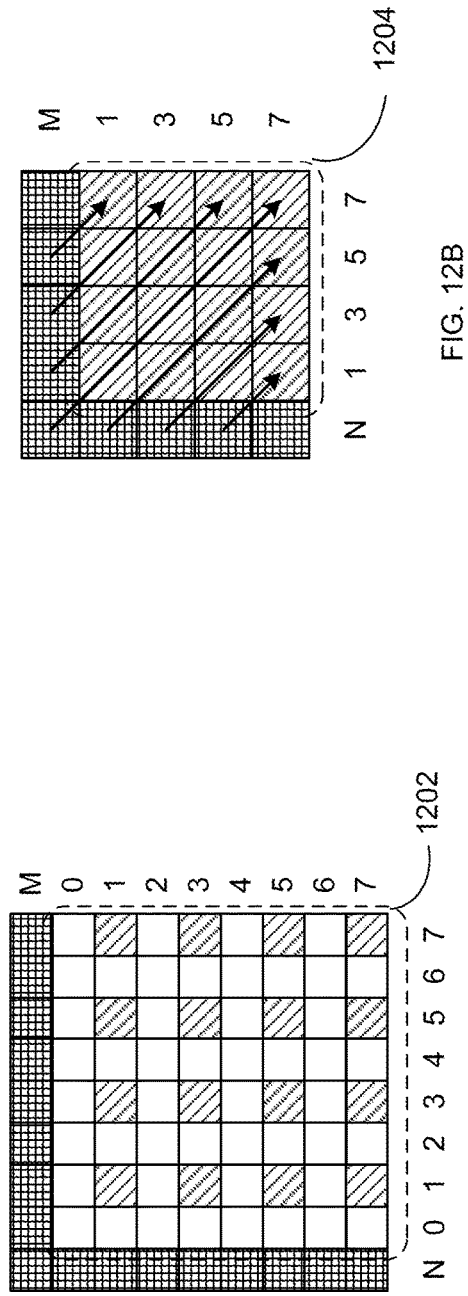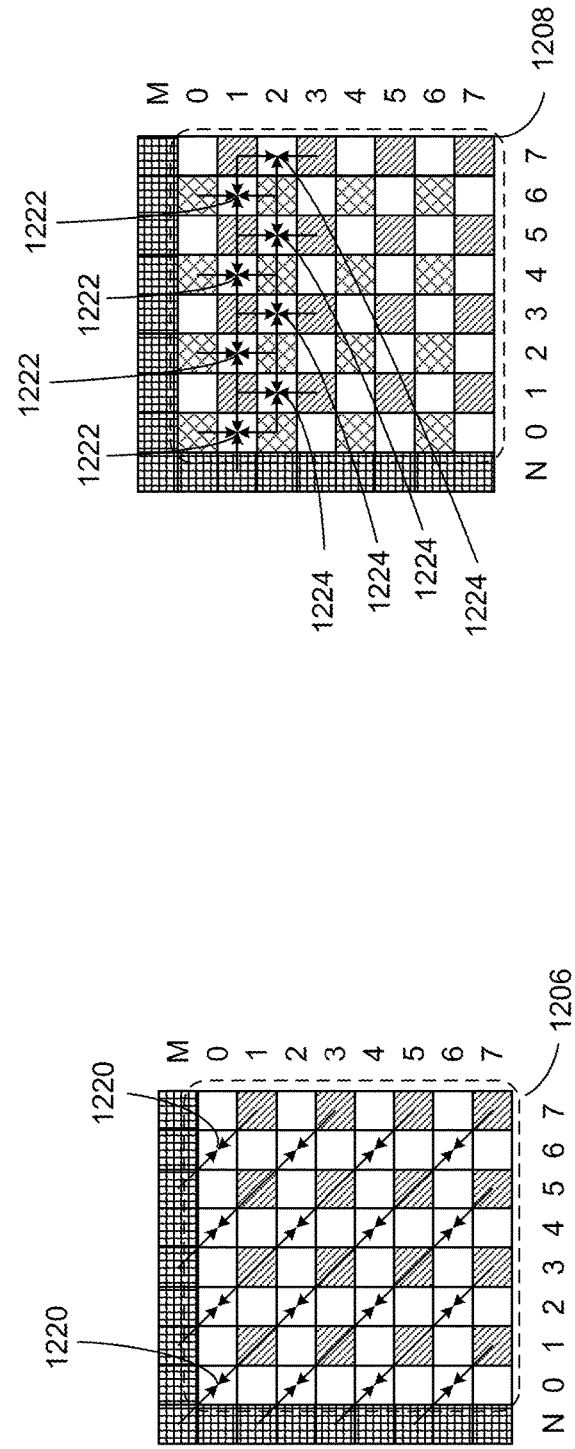
FIG. 12A
FIG. 12B
FIG. 12C
FIG. 12D

SYSTEMS AND METHODS FOR SPATIAL PREDICTION

CROSS-REFERENCE TO RELATED APPLICATIONS

This application is a continuation application of U.S. Non-Provisional application Ser. No. 15/458,919, filed Mar. 14, 2017, which is a continuation application of U.S. patent application Ser. No. 13/615,925, filed Sep. 14, 2012, which claims the benefit of U.S. Provisional Patent Application No. 61/535,043, filed Sep. 15, 2011, the contents of which are hereby incorporated by reference herein.

BACKGROUND

Digital video capabilities may be incorporated into a wide range of devices, including, but not limited to, digital televisions, digital direct broadcast systems, wireless broadcast systems, personal digital assistants (PDAs), laptop or desktop computers, digital cameras, digital recording devices, video gaming devices, video game consoles, cellular or satellite radio telephones, and the like. Digital video devices may implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques may perform spatial prediction and/or temporal prediction to reduce or remove redundancy inherent in video sequences. For block-based video coding, a video frame or slice may be partitioned into blocks. Each block may be further partitioned. In accordance with various coding techniques, blocks in an intra-coded (I) frame or slice may be encoded using spatial prediction with respect to neighboring blocks. Blocks in an inter-coded (P or B) frame or slice may use spatial prediction with respect to neighboring blocks in the same frame or slice or temporal prediction with respect to blocks in other reference frames.

SUMMARY

Systems, methods, and instrumentalities are disclosed relating to intra prediction of a video signal based on mode-dependent subsampling. A processor may receive a block of coefficients associated with a first sub block of a video block, one or more blocks of coefficients associated with one or more remaining sub blocks of the video block, and an indication of a prediction mode for the video block. The processor may determine one or more interpolating techniques based on the prediction mode and a predicted first sub block using intra prediction based on the prediction mode. The processor may add the predicted first sub block to generate a reconstructed first sub block. The processor may determine the predicted sub blocks of the one or more remaining sub blocks based on the one or more interpolating techniques for the video block. The processor may add the predicted sub blocks of the one or more remaining sub blocks to generate one or more reconstructed remaining sub blocks. The processor may form a reconstructed video block based on the prediction mode, the reconstructed first sub block, and the one or more reconstructed remaining sub blocks. The video block may be a luma component or a chroma component of a video signal.

The reconstructed first sub block may be generated by inverse quantizing and inverse transforming the coefficients associated with the first sub block using a first set of inverse quantization and inverse transformation parameters. The first set of inverse transformation and inverse quantization parameters may be associated with a shape-adaptive discrete cosine transformation. Inverse transforming the coefficients associated with the predicted first sub block may include a non-square shaped transform.

The one or more reconstructed remaining sub blocks may be generated by inverse quantizing and inverse transforming the coefficients associated with the one or more remaining sub blocks using a second set of inverse quantization and inverse transformation parameters. The second set of inverse transformation and inverse quantization parameters may be associated with a shape-adaptive discrete cosine transformation. Inverse transforming the coefficients associated with the one or more remaining sub blocks may include a non-square shaped transform. The first set of inverse quantization and inverse transformation parameters may be the same as or different from the second set of inverse quantization and inverse transformation parameters.

A first portion of the one or more reconstructed remaining sub blocks may be generated and, subsequent to generating the first portion of the one or more reconstructed remaining sub blocks, a second portion of the one or more reconstructed remaining sub blocks may be generated based at least partially on the generated first portion.

A video block and a prediction mode may be received. The video block may be subsampled based on the prediction mode to generate a first sub block and one or more sub blocks comprising missing pixels. A predicted first sub block may be determined using intra prediction based on the prediction mode. The first sub block may be reconstructed to generate a reconstructed first sub block. The prediction mode and the reconstructed first sub block may be interpolated to obtain the predicted one or more sub blocks comprising missing pixels. The one or more sub blocks comprising missing pixels may be reconstructed to generate reconstructed one or more sub blocks. A reconstructed video block may be formed based on the reconstructed first sub block, the reconstructed one or more sub blocks comprising missing pixels, and the prediction mode. The video block may be a luma component or a chroma component of a video signal.

The first sub block may be reconstructed based on a first set of transformation and quantization parameters to generate a reconstructed first sub block and the one or more sub blocks comprising missing pixels may be reconstructed based on a second set of transformation and quantization parameters to generate reconstructed one or more sub blocks. The first set of transformation and quantization parameters may be the same as or different from the second set of transformation and quantization parameters.

A first portion of the one or more sub blocks comprising missing pixels may be reconstructed based on a second set of transformation and quantization parameters and, subsequent to reconstructing the first portion of the one or more sub blocks comprising missing pixels, a second portion of the one or more sub blocks comprising missing pixels may be reconstructed based at least partially on the reconstructed first portion. The reconstruction of the second portion of the one or more sub blocks comprising missing pixels may utilize a third set of transformation and quantization parameters, and the third set of transformation and quantization parameters may be the same as the first set of transformation and quantization parameters or the second set of transformation and quantization parameters.

BRIEF DESCRIPTION OF THE DRAWINGS

FIG. 9(A) is a diagram illustrating an example of a horizontal prediction mode.

FIGS. 9(B)-9(D) are diagrams illustrating examples of a horizontal prediction mode interpolation and predicting process.

FIGS. 12(A)-12(D) are diagrams illustrating examples of a diagonal prediction mode interpolation and predicting process.

DETAILED DESCRIPTION

Video coding systems may be used to compress digital video signals to reduce the storage and/or transmission bandwidth of such signals. Various types of video coding systems, such as, but not limited to, block-based, wavelet-based, and object-based systems may be deployed. Examples of block-based video coding systems include, but am not limited to the MPEG1/2/4 part 2, H.264/MPEG-4 part 10 AVC and VC-1 standards.

Figure 1:
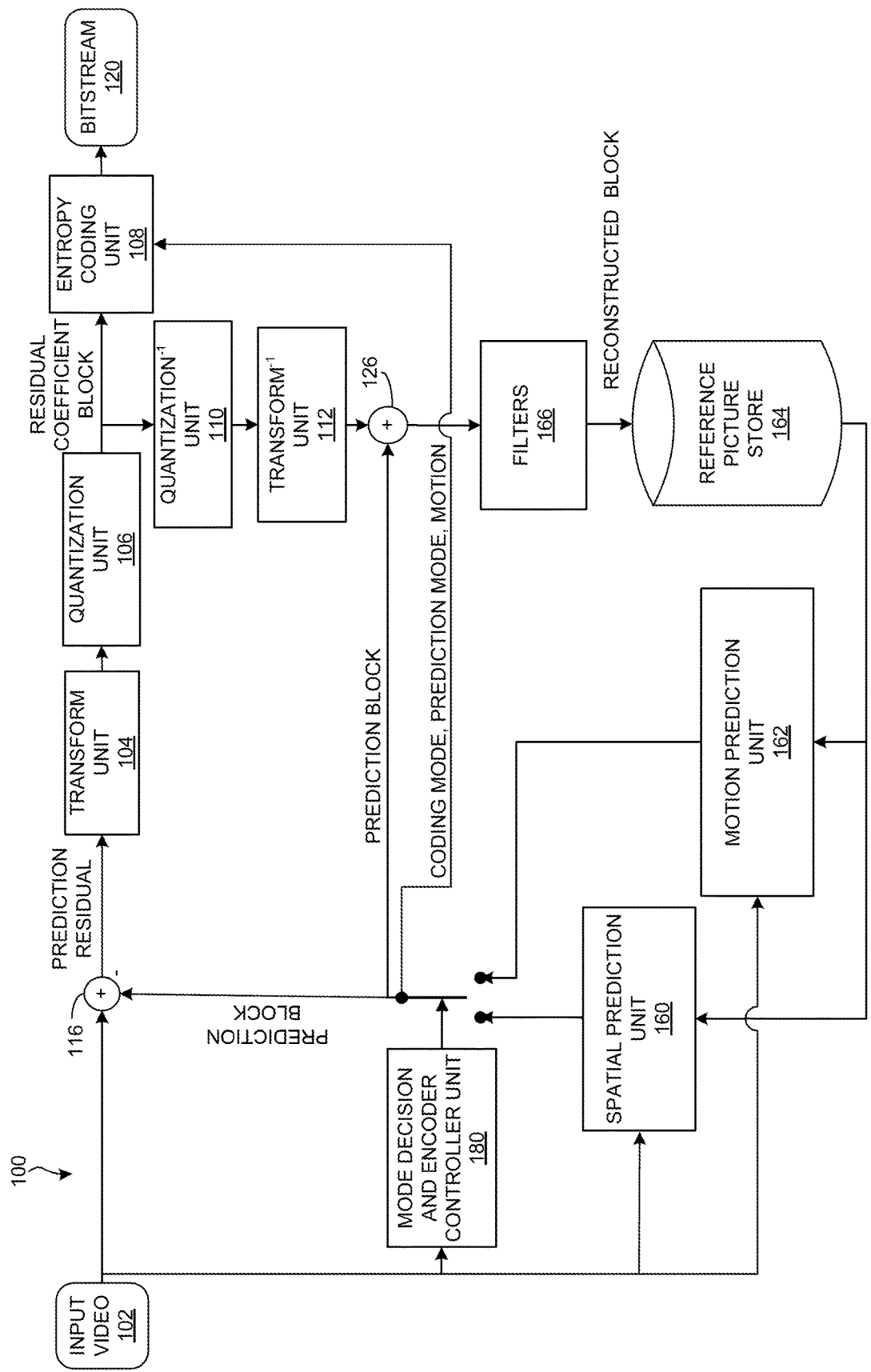
FIG. 1 is a block diagram illustrating an example of a block-based video encoding system.

FIG. 1 is a block diagram illustrating an example of a block-based video encoding system 100. The input video signal 102 may be processed block by block. For example, the video block unit may be 16 pixels by 16 pixels (e.g., a macroblock (MB)). A video coding standard such as High Efficiency Video Coding (HEVC) may be used. In HEVC, extended block sizes (e.g., which may be referred to as a "coding unit" or CU) may be used to compress high resolution (e.g., 1080p and beyond) video signals. For example, a CU in HEVC may be up to 64×64 pixels and down to 4×4 pixels. A CU may be partitioned into prediction units (PU), for which separate prediction implementations may be applied. Each input video block (e.g., MB, CU, PU, etc.) may be processed by using a spatial prediction unit 160 and/or a temporal prediction unit 162.

Spatial prediction (or intra prediction) may use pixels from the coded neighboring blocks in the same video picture/slice to predict the current video block. Spatial prediction may reduce spatial redundancy inherent in the video signal. Temporal prediction (or inter prediction or motion compensated prediction) may use pixels from the already coded video pictures to predict the current video block. Temporal prediction may reduce temporal redundancy inherent in the video signal. Temporal prediction for a given video block may be signaled by one or more motion vectors (MV) that may indicate the amount and/or the direction of motion between the current block and one or more of its reference blocks.

If multiple reference pictures are supported (e.g., as may be the case for H.264/AVC and HEVC), then for each video block its reference picture index may be sent. The reference index may be used to identify from which reference picture in the reference picture store 164 the temporal prediction signal comes. After spatial and/or temporal prediction, the mode decision and encoder controller 180 in the encoder may choose the prediction mode. The prediction mode may be selected, for example, based on a rate-distortion optimization implementation. The prediction block may be subtracted from the current video block at adder 116. The prediction residual may be transformed by transformation unit 104 and quantized by quantization unit 106. The quantized residual coefficients may be inverse quantized at inverse quantization unit 110 and inverse transformed at inverse transformation unit 112 to form the reconstructed residual. The reconstructed block may be added back to the prediction block at adder 126 to form the reconstructed video block. Further in-loop filtering, such as but not limited to, a deblocking filter and/or adaptive loop filter 166, may be applied on the reconstructed video block before it is put in the reference picture store 164 and/or used to code future video blocks. To form the output video bitstream 120, coding mode (e.g., inter or intra) information, prediction mode information, motion information, and/or quantized residual coefficients may be sent to the entropy coding unit 108 to be compressed and packed to form the bitstream 120. For example, the implementations described herein may be implemented, at least partially, within the spatial prediction unit 160.

Figure 2:
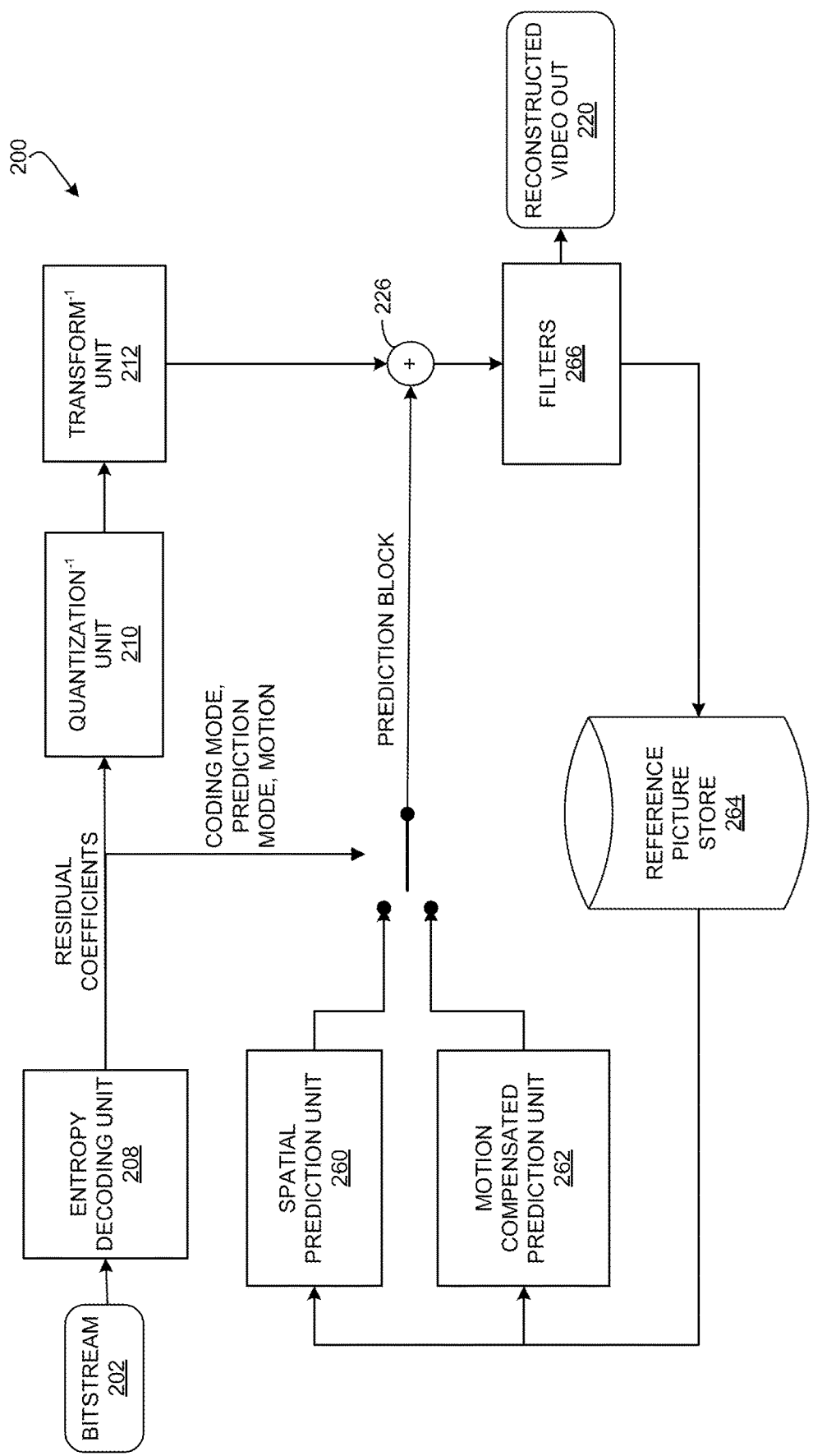
FIG. 2 is a block diagram illustrating an example of a block-based video decoder system.

FIG. 2 is a block diagram illustrating an example of a block-based video decoder 200. The video bitstream 202 may be unpacked and entropy decoded at entropy decoding unit 208. The coding mode and prediction information may be sent to the spatial prediction unit 260 (e.g., if intra coded) or the temporal prediction unit 262 (e.g., if inter coded) to form the prediction block. The residual transform coefficients may be sent to inverse quantization unit 210 and inverse transform unit 212 to reconstruct the residual block. The prediction block and the residual block may be added together at 226. The reconstructed block may go through in-loop filtering unit 266 before it is stored in reference picture store 264. For example, the reconstructed video 220 may be sent out to drive a display device and/or used to predict future video blocks.

The implementations described herein may be applicable to spatial prediction units 160 and 260. The spatial prediction implementations (e.g., units) described herein may be used in conjunction with video coding standards (e.g., H.264/AVC, HEVC, etc.). The terms "spatial prediction" and "intra prediction" may be used interchangeably herein.

Figure 3:
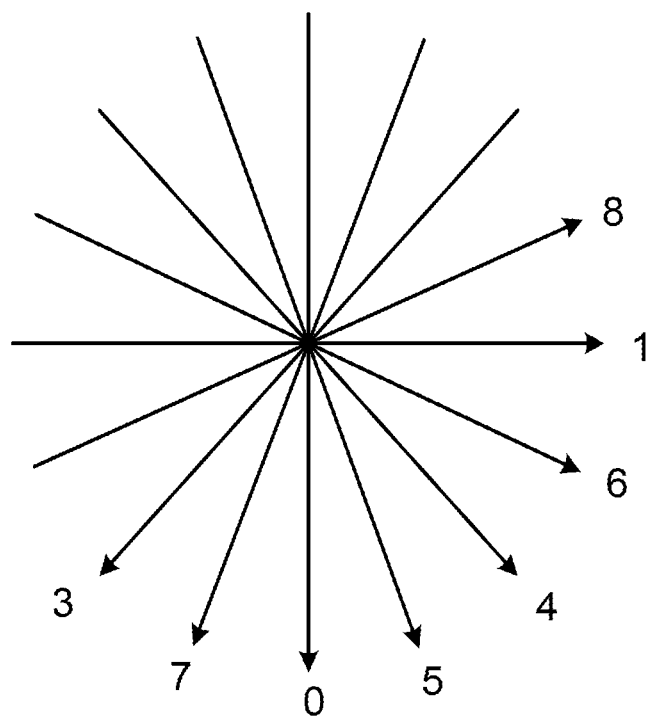
FIG. 3 is a diagram illustrating an example of prediction modes that may be supported.
Figure 4:
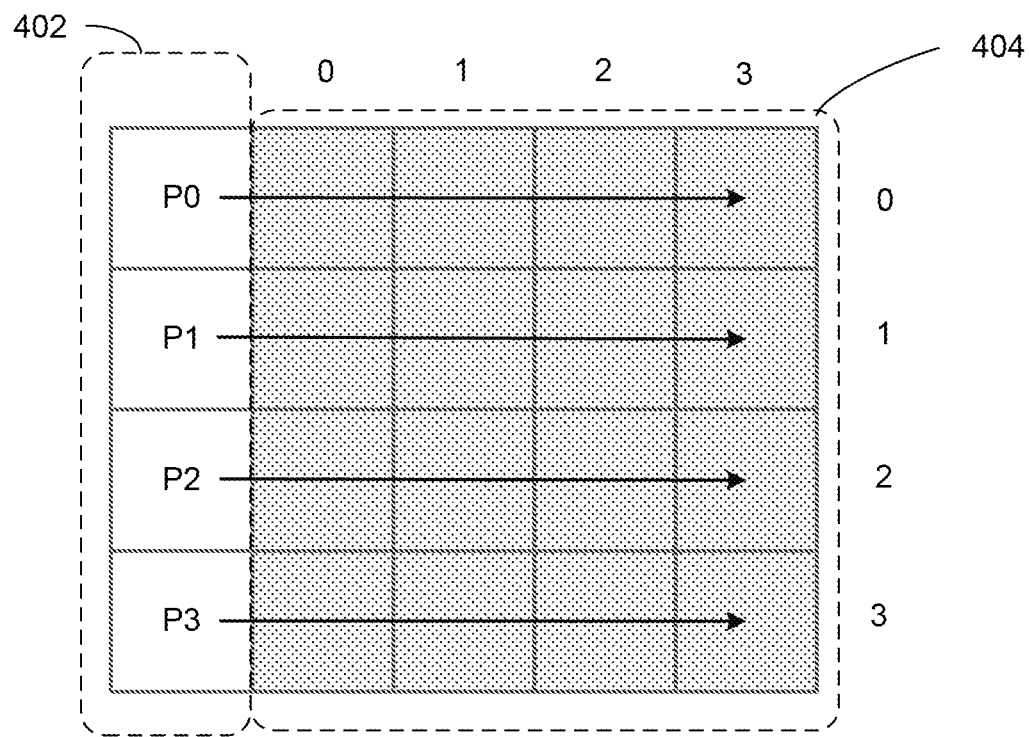
FIG. 4 is a diagram illustrating an example of horizontal prediction for a 4×4 block.

Spatial prediction may be performed on video blocks or regions of various sizes and shapes. For example, block sizes of 4×4, 8×8, and 16×16 pixels for spatial prediction of the luma component of the video signal may be utilized (e.g., as in H.264/AVC), and block size of 8×8 pixels for the chroma components of the video signal may be utilized (e.g., as in H.264/AVC). For a luma block of size 4×4 or 8×8, a total of nine prediction modes may be supported (e.g., 8 directional prediction modes and the DC mode). The eight prediction directions that may be supported (e.g., in H.264/AVC) are illustrated in FIG. 3. FIG. 3 is a diagram illustrating an example of prediction modes that may be supported. For luma block of size 16×16, a total of 4 prediction modes may be supported (e.g., horizontal prediction mode, vertical prediction mode, DC prediction mode, and planar prediction mode). FIG. 4 is a diagram illustrating an example of horizontal prediction for a 4×4 block. In FIG. 4, the reconstructed pixels 402 (P0, P1, P2 and P3) may be used to predict the pixels 404 in the 4×4 video block. Prediction may be performed according to Equation (1):

$$L(x,0)=P0$$

$$L(x,1)=P1$$

$$L(x,2)=P2$$

$$L(x,3)=P3 \quad \text{Equation (1)}$$

where $L(x,y)$ may be the pixel to be predicted at $(x,y)$, $x,y=0 \ldots 3$.

Figure 5:
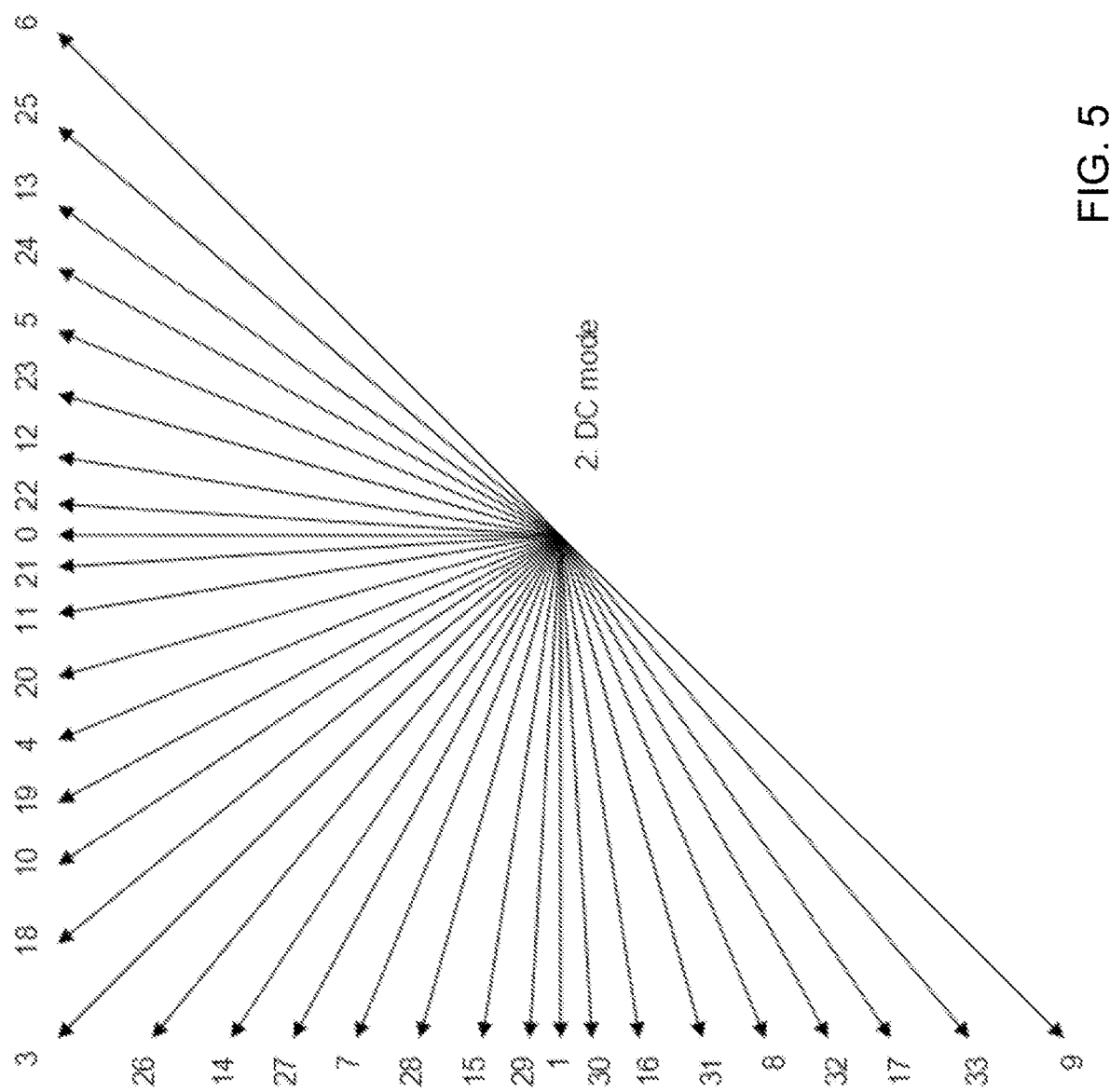
FIG. 5 is a diagram illustrating an example of 34 directional intra prediction modes.

Spatial prediction using larger block sizes may be supported (e.g., in HEVC test model HM3.0). For example, spatial prediction may be performed on square block sizes of 4×4, 8×8, 16×16, 32×32, or 64×64. Additional intra prediction modes may be supported, for example, up to 33 directional intra prediction modes, together with the DC prediction mode and the planar prediction mode may be supported. FIG. 5 is a diagram illustrating an example of 34 directional intra prediction modes (including the DC prediction mode and the planar prediction mode)(e.g., in HM3.0). Table 1 illustrates an example of a number of prediction directions that may be supported for each block size (e.g., in HM3.0). Directional intra prediction may be performed (e.g., in HEVC) with 1/32-pixel precision.

TABLE 1

| Intra block size | Prediction Directions |
|---|---|
| 4 × 4 | 16 |
| 8 × 8 | 33 |
| 16 × 16 | 33 |
| 32 × 32 | 33 |
| 64 × 64 | 2 |

Figure 6:
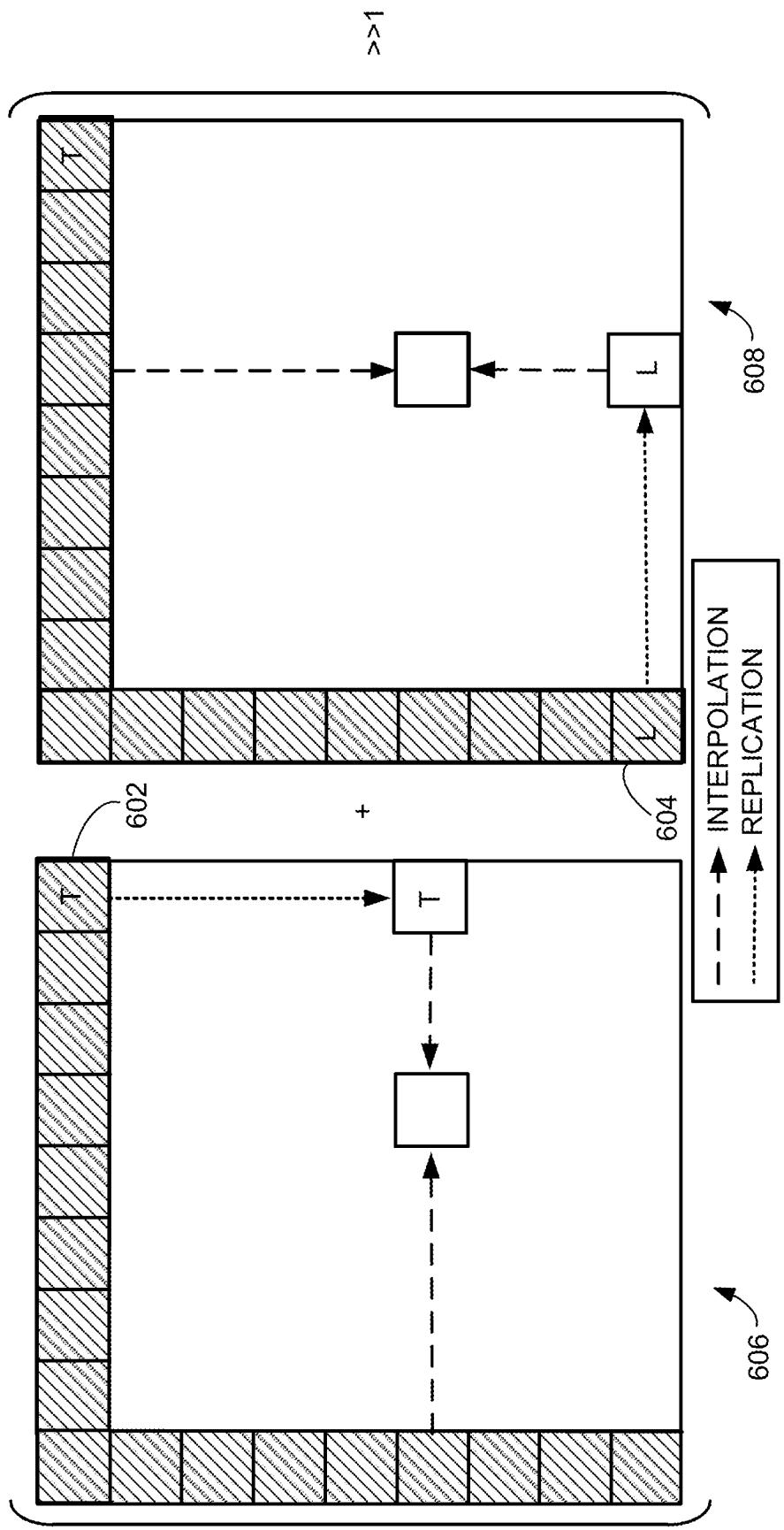
FIG. 6 is a diagram illustrating an example of a non-directional intra prediction mode.

Non-directional intra prediction modes may also be supported (e.g., in H.264/AVC and HEVC). For example, the DC prediction mode and the planar prediction mode may be supported. For the DC mode, the prediction value may be obtained by averaging the available neighboring pixels and applying the average value to the entire block uniformly. For the planar mode, 16×16 luma blocks and chroma blocks may be utilized (e.g., H.264/AVC), or a plurality of block sizes may be utilized (e.g. HEVC HM3.0). The planar mode (e.g., in HEVC HM3.0) may use linear interpolation to predict smooth regions with slow transitions. FIG. 6 is a diagram illustrating an example of a non-directional intra prediction mode. As shown in FIG. 6, the planar mode (e.g., in HM3.0) may be performed by the following implementation:

1. The rightmost pixel 602 in the top row (e.g., marked by T) may be replicated to predict pixels in the rightmost column;
2. The bottom pixel 604 in the left column (e.g., marked by L) may be replicated to predict pixels in the bottom row;
3. Bilinear interpolation in the horizontal direction (e.g., block 606) may be performed to produce a first prediction $H(x,y)$ of center pixels;
4. Bilinear interpolation in the vertical direction (e.g., block 608) may be performed to produce a second prediction $V(x,y)$ of center pixels; and
5. An additional averaging between the horizontal prediction and the vertical prediction may be performed to obtain the final prediction $L(x,y)$, using for example, $L(x,y)=((H(x,y)+V(x,y))>>1)$.

Using a block-based intra prediction implementation, the entire block may be predicted from reconstructed neighboring pixels to the left and/or to the top of the current block. For the pixels located toward the right and bottom portion of the block, the distance between the pixels and pixels that may be used for prediction may increase. For example, as the distance increases between the prediction pixels and the pixels being predicted, the correlation between these pixels may decrease and the prediction accuracy may decrease. This decrease in accuracy may be further aggravated for larger block sizes (e.g., for HEVC which supports intra prediction using larger block sizes (e.g., 16×16 and above)).

Figure 7:
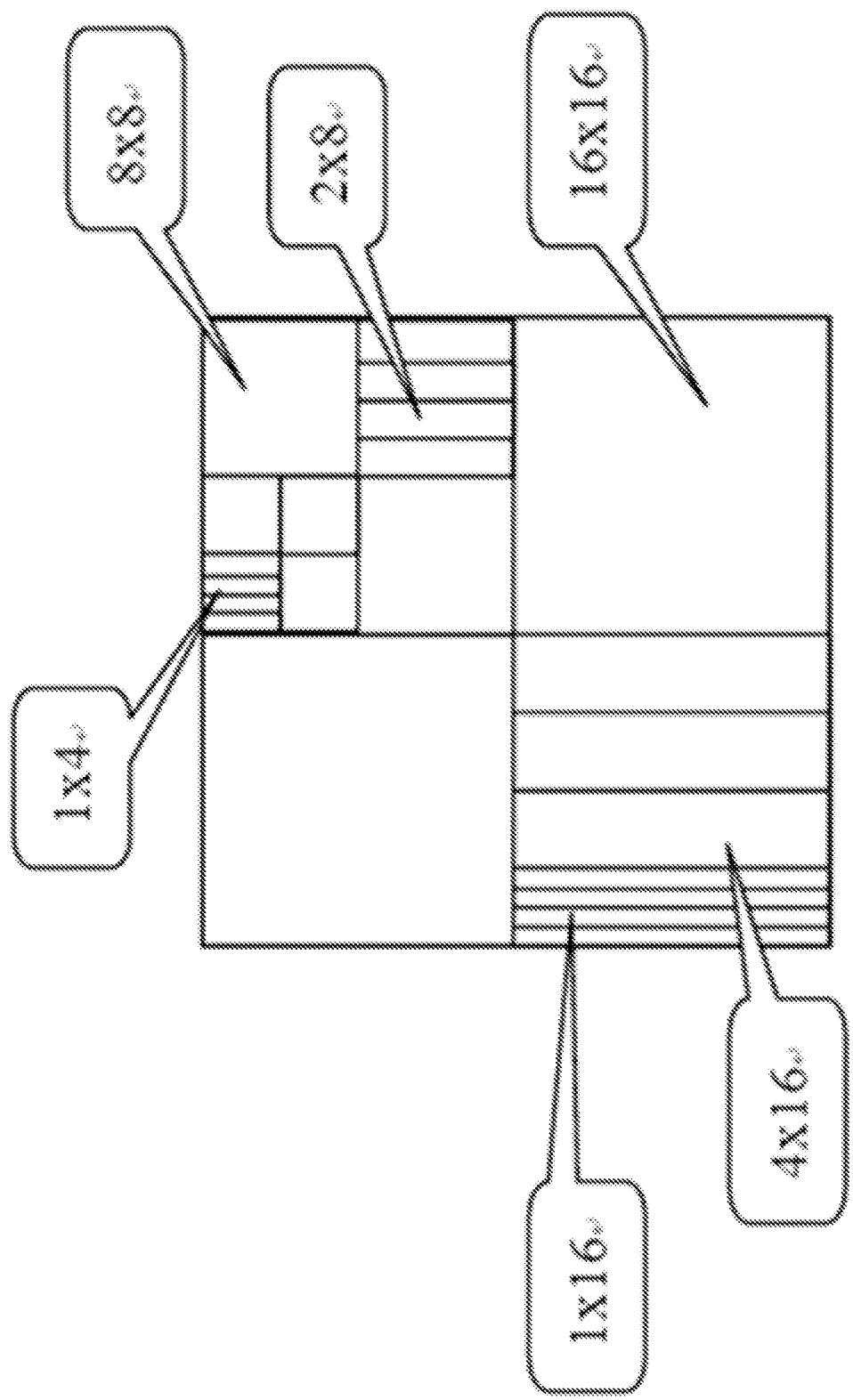
FIG. 7 is a diagram illustrating an example of Short Distance Intra Prediction on a 32×32 block.

Implementations (e.g., line-based intra coding) may address issues related to the reduced prediction accuracy when pixel distance increases. Instead of applying prediction to the whole block from the top and left neighbors, line based prediction implementations may predict the block one line at a time. As each line gets predicted and reconstructed, it may be used to predict the next line. A line-based intra prediction implementation may be performed either row-by-row or column-by-column. A line-based intra coding implementation may be incorporated into an implementation referred to as Short Distance Intra Prediction or SDIP. A SDIP implementation may partition each square block of size N×N (e.g., N×N may be anywhere between 4×4 and 64×64) into a combination of rectangle blocks of size M×K. When either M or K is equal to 1, SDIP may become equivalent to line-based intra prediction. Pixels may be predicted and reconstructed rectangle-by-rectangle. FIG. 7 is a diagram illustrating an example of SDIP on a 32×32 block. The 32×32 block may be partitioned into four 16×16 blocks. Looking at the bottom-left 16×16 block, for example, it may be partitioned into four 4×16 rectangular blocks. The left most 4×16 block may be further partitioned into four 1×16 vertical lines, and then predicted and reconstructed line-by-line. The remaining three 4×16 rectangular blocks may be predicted and reconstructed rectangle-by-rectangle. SDIP may provide flexible ways to partition a video block. The video encoder may search through different combinations to find the optimal partitioning mode.

Line-based intra prediction and SDIP may shorten the distance between the prediction pixels and those being predicted. Line-based intra prediction and SDIP may increase computational complexity and implementation complexity, for example, at the encoder side and/or at the decoder side. To support various rectangular block sizes, transform, quantization, residual coefficient scanning, and entropy coding may be changed. The encoder may search through many additional modes, for example, as described herein.

Implementations described herein may relate intra prediction techniques which may be referred to as Mode-Dependent Subsampling Intra Prediction (MDS-IP). MDS-IP may alleviate or reduce the reduction in prediction accuracy as pixel distance increases. Transform, quantization, coefficient scanning, and entropy coding processes may be modified slightly when implementing MDS-IP. The encoder may not consider any additional modes when choosing an optimal prediction mode, or the encoder may consider one or more additional modes when choosing the optimal prediction mode.

The term "video block" may be used herein as an expansive general term. The implementations described herein may be applied to a variety of video blocks, such as, but not limited to blocks of a luma component and blocks of a chroma component. The terms "samples" and "pixels" may be used interchangeably. The terms "subsampled blocks" and "subblocks" may be used interchangeably.

Figure 8:
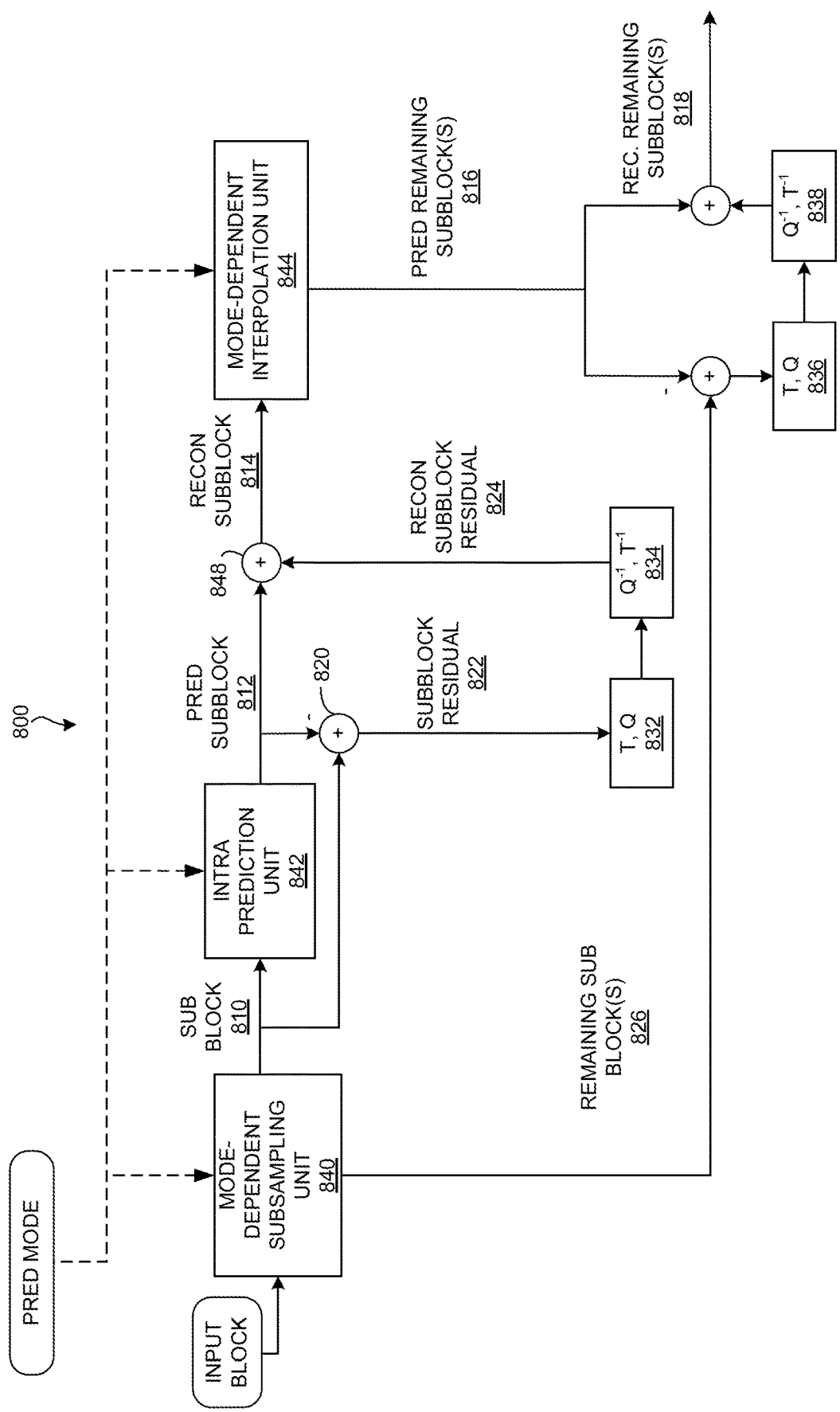
FIG. 8 is a block diagram illustrating an example of an encoder implementing Mode-Dependent Subsampling Intra Prediction (MDS-IP).

FIG. 8 is a block diagram illustrating an example of an encoder 800 implementing MDS-IP. The MDS-IP encoder block diagram may be incorporated into an encoder, for example, an encoder similar to the encoder 100 exemplified in FIG. 1 (e.g., at the spatial prediction block 160). The encoder (e.g., via a processor) may receive a video stream comprising one or more video blocks. The encoder may perform subsampling on a video block, which may partition the video block into a first subsampled block 810 and one or more remaining subsampled blocks 826. For example, after receiving a prediction mode and based on the prediction mode (e.g., one of the prediction modes described herein), a specific subsampling implementation may be performed by the mode-dependent subsampling unit 840. The prediction mode may be determined, for example, by a mode decision and encoder controller (e.g., the mode decision and encoder controller 180 of FIG. 1). As a result of subsampling, a portion (e.g., one half or one quarter) of the input video block may be retained as the subsampled block 810. The subsampled block 810 may be referred to as a first sub block. The other portion of the block (e.g., the portion of the block "removed" during subsampling) may be referred to as the remaining sub blocks 826 (e.g., as illustrated in FIG. 8). The remaining sub blocks 826 may comprise missing pixels.

The subsampling implementation may be a decimation process. The subsampling implementation may be a relatively more sophisticated process involving downsampling filters. A predicted subsampled block 812 may be determined (e.g., generated) by the intra prediction unit 842 based on the prediction mode. The intra prediction unit 842 may receive neighboring pixels, for example, such as those described herein (e.g., with reference to FIGS. 9-17). The prediction mode may be, for example, any of the directional or non-directional intra prediction modes, as described herein. For example, the directional prediction mode may be a vertical prediction mode, a horizontal prediction mode, a diagonal prediction mode, or a non-diagonal prediction mode. For example, the non-directional prediction mode may be a DC prediction mode or a planar prediction mode. The predicted subsampled block 812 may be subtracted from the subsampled block 810 by adder 820 to get the subsampled block residual 822. The subsampled block residual 822 may be transformed and quantized at transformation and quantization block 832. The transformation and quantization block 832 may generate a block of coefficients that are associated with the subsampled block 810. The subsampled block residual 822 (e.g., the block of coefficients that are associated with the subsampled block 810) may be inverse quantized and inverse transformed at inverse quantization and inverse transformation block 834 to obtain the reconstructed subsampled block residual 824. The reconstructed subsampled block residual 824 may be added to the predicted subsampled block 812 at adder 848 to form a reconstructed subsampled block 814.

For example, the transformation and quantization block 832 may use a set (e.g., a first set) of transformation and quantization parameters. The set of transformation and quantization parameters used by the transformation and quantization block 832 may be based on a non-square shaped transform. The non-square shaped transformed may comprise a plurality of square-shaped transforms. The set of transformation and quantization parameters used by the transformation and quantization block 832 may be associated with a shape-adaptive discrete cosine transformation.

For example, the inverse quantization and inverse transformation block 834 may use a set (e.g. a first set) of inverse quantization and inverse transformation parameters. The set of inverse quantization and inverse transformation parameters used by the inverse quantization and inverse transformation block 834 may be based on a non-square shaped transform. The non-square shaped transformed may comprise a plurality of square-shaped transforms. The set of inverse quantization and inverse transformation parameters used by the inverse quantization and inverse transformation block 834 may be associated with a shape-adaptive discrete cosine transformation.

The reconstructed subsampled block 814 may be interpolated by the mode-dependent interpolation unit 844 to generate a prediction for the one or more subsampled blocks 816 comprising missing samples, which may be based on the prediction mode. The specific interpolation process performed by the mode-dependent interpolation unit 844 may be mode-dependent. For example, the specific interpolation process performed by the mode-dependent interpolation unit 844 may be the reverse process of the mode dependent subsampling process utilized by mode-dependent subsampling unit 840. The prediction accuracy of the one or more subsampled blocks 816 comprising the missing samples may be relatively increased since the distance between the prediction pixels and those to be predicted may be reduced (e.g., may be significantly reduced).

Still referring to FIG. 8, the prediction residual corresponding to the one or more subsampled blocks 816 comprising the missing samples may be transformed and quantized at transformation and quantization block 836. The transformation and quantization block 836 may generate a block of coefficients that are associated with the remaining sub blocks 826. The prediction residual corresponding to the one or more subsampled blocks 816 comprising the missing samples (e.g., the block of coefficients that are associated with the remaining sub blocks 826) may be inverse quantization and inverse transformation at inverse quantization and inverse transformation block 838. The reconstructed residual may be added back to the predicted one or more subsampled block(s) comprising the missing samples 816 to form the reconstructed one or more subsampled blocks comprising the missing samples 818. The reconstructed subsampled block 814 and the reconstructed one or more subsampled blocks comprising the missing samples 818 may form the coded representation of the input video block (e.g., a reconstructed video block). The formation of the coded representation of the input video block may be based on the prediction mode.

For example, the transformation and quantization block 836 may use a set (e.g., a second set) of transformation and quantization parameters. The set of transformation and quantization parameters used by the transformation and quantization block 836 may be based on a non-square shaped transform. The non-square shaped transformed may comprise a plurality of square-shaped transforms. The set of transformation and quantization parameters used by the transformation and quantization block 836 may be associated with a shape-adaptive discrete cosine transformation.

For example, the inverse quantization and inverse transformation block 838 may use a set (e.g. a second set) of inverse quantization and inverse transformation parameters. The set of inverse quantization and inverse transformation parameters used by the inverse quantization and inverse transformation block 838 may be based on a non-square shaped transform. The non-square shaped transformed may comprise a plurality of square-shaped transforms. The set of inverse quantization and inverse transformation parameters used by the inverse quantization and inverse transformation block 838 may be associated with a shape-adaptive discrete cosine transformation.

The transformation and quantization block 836 may or may not use the same parameters as the parameters used by the transformation and quantization block 832 (e.g., the second set of transformation and quantization parameters may be the same as or may be different from the first set of transformation and quantization parameters). The inverse quantization and inverse transformation block 838 may or may not use the same parameters as the parameters used by the inverse quantization and inverse transformation block 834 (e.g., the second set of inverse quantization and inverse transformation parameters may be the same as or may be different from the first set of inverse quantization and inverse transformation parameters).

Using the subsampled block 810 to predict the one or more subsampled blocks 816 comprising the missing samples may improve prediction accuracy by reducing the distance between the prediction pixels and those to be predicted. Better prediction accuracy may result in reduced prediction residual energy, which in turn may result in a significant reduction in the number of bits used to code such residual signals. When subsampling is performed by a factor of two in the horizontal dimension and/or in the vertical dimension, the resulting subsampled block sizes may be regular. For example, if the input video block is of size 2N×2N, then the subsampled block size may be 2N×N, N×2N or N×N. To process subsampled blocks of size 2N×N or N×2N, for example, the block transforms and coefficient scanning orders designed for a square block may be applied without further change. For example, for a subsampled block of size 2N×N or N×2N, the subsampled block may be processed by applying two (2) N×N transforms, followed by the coefficient scanning order designed for square blocks. Modifications to block transforms and coefficient scanning order to support 2N×N or N×2N block sizes may be applied for improved coding efficiency.

Subsampling may be performed in more than one direction. The subsampling rates may be the same or may be different for each of the directions. For example, subsampling may be performed in a first direction at a first subsampling rate and in a second dimension at a second subsampling rate. The first subsampling rate may be the same as or different from the second subsampling rate.

For the one or more subsampled blocks comprising the missing samples 816, for example, the transform and quantization unit 836 and the inverse quantization and inverse transform unit 838 may be skipped (e.g., the prediction residual may not be coded), as the prediction process using mode-dependent interpolation unit 844 may be sufficiently accurate that residual coding may be by-passed. The transform and quantization unit 836 and the inverse transform and inverse quantization unit 838 may be split into two or more steps and may be performed in a cascaded manner, for example, as described herein.

The decision regarding whether to perform the MDS-IP implementation may be decided prior to encoding. For example, MDS-IP may be performed for blocks of certain sizes and certain prediction modes. No additional signaling in the bitstream may be required. The selection may be decided "on-the-fly" by the encoder, for example, based on one or more parameters, such as, but not limited to rate-distortion optimization considerations. An additional syntax element may be signaled in the bitstream (e.g., bitstream 120) to convey to the decoder which implementation (e.g., MDS-IP) may be used. The decision may be based on, for example, the size of the block. Different blocks may be more or less prone to distance induced prediction accuracy issues depending on their sizes.

Although an encoder is described with reference to FIG. 8, a decoder implementing MDS-IP may comprise one or more of the elements described with reference to FIG. 8 and/or may perform similar implementations (e.g., inverse implementations) to decode an encoded video stream. An MDS-IP decoder block diagram may be incorporated into a decoder, for example, a decoder similar to the decoder 200 exemplified in FIG. 2 (e.g., at the spatial prediction block 260). For example, although transformation and quantization and inverse quantization and inverse transformation may be performed on the sub block 810 and the remaining sub blocks 826 by the encoder, the decoder may perform inverse quantization and inverse transformation but not perform transformation and quantization when reconstructing the video block from the one or more blocks of coefficients associated with the first sub block 810 and the remaining sub blocks 826.

Figure 20:
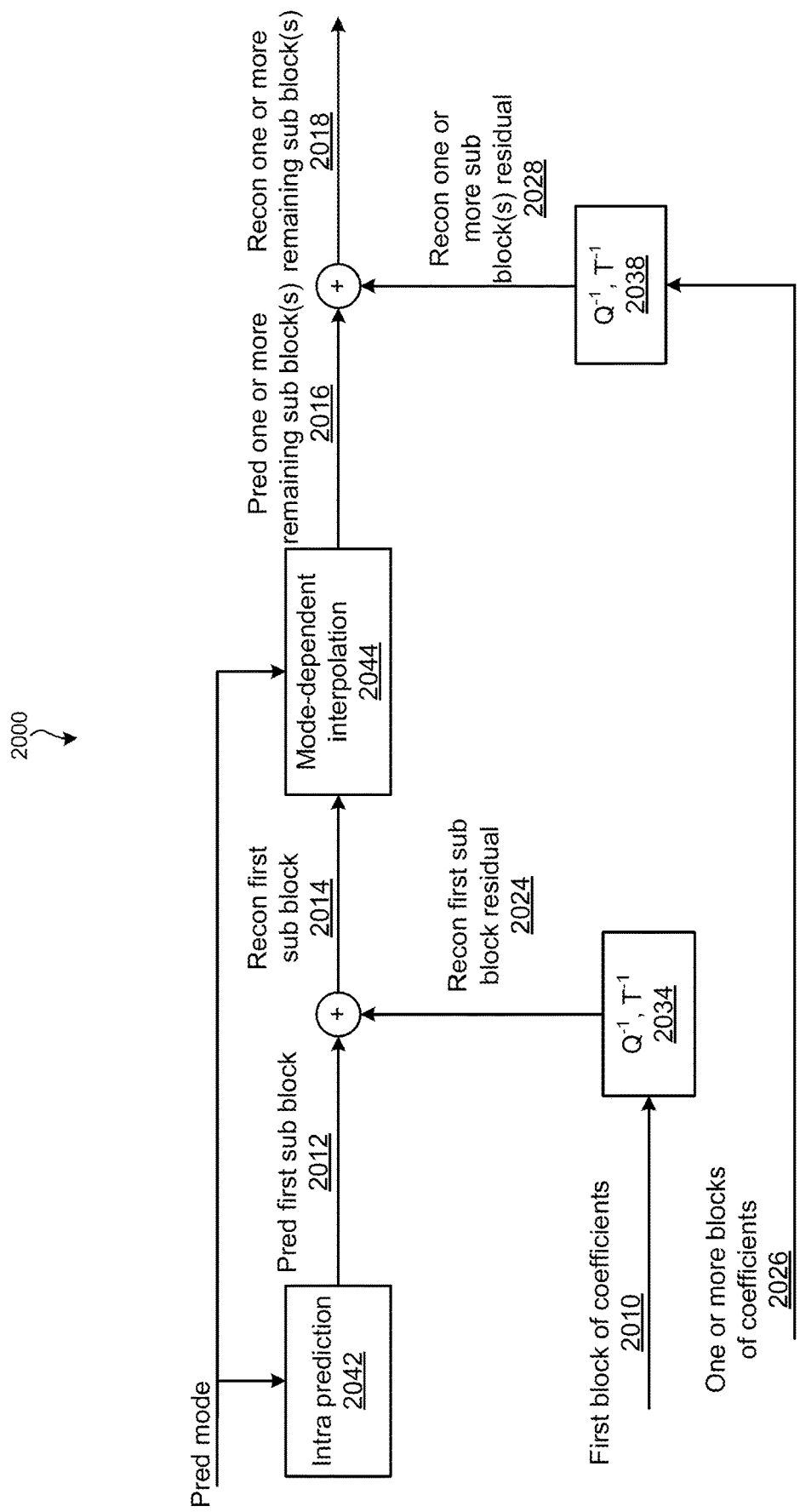
FIG. 20 is a block diagram illustrating an example of a decoder implementing Mode-Dependent Subsampling Intra Prediction (MDS-IP).

FIG. 20 is a block diagram illustrating an example of a decoder implementing Mode-Dependent Subsampling Intra Prediction (MDS-IP). A MDS-IP decoder 2000 may be incorporated into a decoder, for example, a decoder similar to the decoder 200 exemplified in FIG. 2 (e.g., at the spatial prediction block 260). The MDS-IP decoder 2000 (e.g., via a processor) may receive an encoded video stream. The encoded video stream may comprise one or more blocks of coefficients representing one or more encoded video blocks. The encoded video blocks may be a luma component or a chroma component of the encoded video stream. Each of the one or more encoded video blocks may be partitioned into a first sub block and one or more remaining sub blocks. After receiving a block of coefficients 2010 associated with the first sub block, the decoder may perform inverse quantization and inverse transformation at inverse quantization and inverse transformation unit 2034 on the block of coefficients 2010 to generate a reconstructed residual 2024 corresponding to the first sub block. After receiving one or more blocks of coefficients 2026 associated with the one or more remaining sub blocks, the decoder may perform inverse quantization and inverse transformation at inverse quantization and inverse transformation unit 2038 on the one or more blocks of coefficients 2026 to generate a reconstructed residual corresponding to the one or more remaining sub blocks 2028.

The decoder may receive an indication of a prediction mode for the video block and determine one or more interpolating techniques based on the prediction mode. For example, intra prediction unit 2042 may receive an indication of a prediction mode for the video block. The intra prediction unit 2042 may also receive neighboring pixels, for example, such as those described herein (e.g., with reference to FIGS. 9-17). The decoder may determine a predicted first sub block 2012 using intra prediction based on the prediction mode. The decoder may add the predicted first sub block 2012 to a reconstructed residual 2024 corresponding to the first sub block to generate a reconstructed first sub block 2014. The decoder may determine the predicted sub blocks of the one or more remaining sub blocks 2016 based on the one or more interpolating techniques for the video block. The predicted sub blocks of the one or more remaining sub blocks 2016 may be determined by the mode-dependent interpolation unit 2044. The one or more interpolating techniques may be based on the prediction mode. The decoder may add the predicted sub blocks of the one or more remaining sub blocks 2016 to a reconstructed residual corresponding to the one or more remaining sub blocks 2028 to generate one or more reconstructed remaining sub blocks 2018. The decoder may form a reconstructed video block based on the prediction mode, the reconstructed first sub block 2014, and the one or more reconstructed remaining sub blocks 2018.

The reconstructed residual 2024 corresponding to the first sub block may be generated using a set (e.g., a first set) of inverse quantization and inverse transformation parameters. The set of inverse quantization and inverse transformation parameters used to generate the reconstructed residual 2024 corresponding to the first sub block may be associated with a shape-adaptive discrete cosine transformation. Inverse transforming the coefficients associated with the predicted first sub block may include a non-square shaped transform. The non-square shaped transform may include a plurality of square-shaped transforms. The reconstructed residual corresponding to the one or more remaining sub blocks 2028 may be generated using a set (e.g., a second set) of inverse quantization and inverse transformation parameters. The set of inverse quantization and inverse transformation parameters used to generate the reconstructed residual corresponding to the one or more remaining sub blocks 2028 may be associated with a shape-adaptive discrete cosine transformation. The set of inverse quantization and inverse transformation parameters used to generate the reconstructed residual corresponding to the first sub block 2024 may be the same as or different from the set of inverse quantization and inverse transformation parameters used to generate the reconstructed residual corresponding to the one or more remaining sub blocks 2028.

FIG. 9(A) is a diagram illustrating an example prediction process for an 8×8 block using a horizontal mode. As illustrated by the arrows in FIG. 9(A), prediction pixels 902 from already coded neighbors may be propagated through columns 0 through 7 using equation (1) to predict the 8×8 block 904. FIGS. 9(B)-9(C) are diagrams illustrating an example MDS-IP process for an 8×8 block. While an 8×8 block is shown, MDS-IP may be used for blocks having a variety of sizes. In the MDS-IP process, the 8×8 block may be downsampled in the horizontal direction. FIG. 9(B) and FIG. 9(C) may illustrate the 8×8 block before and after downsampling, respectively. The pixels which remain in the subblock after subsampling may be shaded in FIG. 9(B). As a result of the subsampling, subsampled block 910 may comprise columns 1, 3, 5 and 7 (e.g., as shown in FIG. 9(C)). A 2:1 subsampling rate may be used (e.g., as shown in FIGS. 9(A)-9(D). A wide variety of subsampling rates may be used. Columns 1, 3, 5 and 7 may be predicted in the horizontal direction (e.g., as may be indicated by the arrows in FIG. 9(C)) to form the predicted subsampled block 812 (e.g., FIG. 8). The residual of the subsampled block may go through transformation, quantization, inverse transformation, and inverse quantization to form the reconstructed prediction residual 824. The reconstructed prediction residual 824 may be added to the predicted subsampled block 812 to form the reconstructed subsampled block 814. Block transform and coefficient scanning designed for square shaped blocks may be used. For example, two 4×4 block transforms may be used to complete the transformation and quantization and subsequent inverse quantization and inverse transformation by units 832 and 834. Modifications to the block transform and coefficient scanning order may be made to support rectangular blocks (e.g., the 4×8 block in FIG. 9(C)). For example, a 4×8 block transform and appropriate coefficient scanning may be used by units 832 and 834.

The second subsampled block of 4×8 pixels comprising the missing columns 0, 2, 4 and 6 may be predicted by interpolating from the already coded neighboring column and the reconstructed pixels in columns 1, 3, 5, 7 (e.g., as illustrated in FIG. 9(D)). Various interpolation filters may be applied. For example, a bilinear filter, a 6-tap filter with coefficients [1-5 20 20-5 1]/32, a 4-tap filter with coefficients [1 3 3 1]/8, and/or other interpolation filters with other tap lengths may be applied. FIG. 9(D) may illustrate interpolation in the horizontal direction using two neighboring pixels. More pixels may be involved in the interpolation process (e.g., when filters of longer tap lengths are used). Performing horizontal downsampling for the horizontal prediction mode may be based on the premise that blocks that benefit from the horizontal prediction mode may have strong pixel correlation in the horizontal direction. Other prediction modes may utilize other downsampling processes. The residual of the second subsampled block may be coded following steps 836 and 836 (e.g., FIG. 8), for example, using two square block transforms or one rectangular block transform and appropriate coefficient scanning. If the mode dependent interpolation provides suitable results, determining the residual of the second subsampled block may be by-passed (e.g., not coded).

Figure 10C:
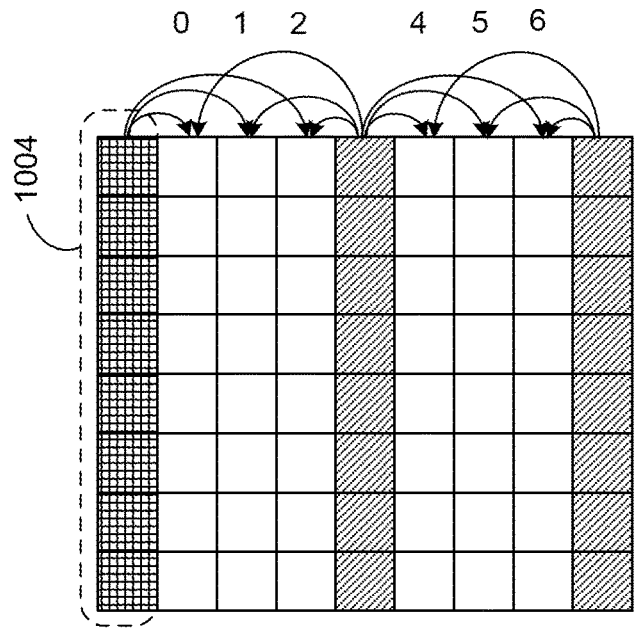
FIGS. 10(A)-10(C) are diagrams illustrating examples of a vertical prediction mode interpolation and predicting process.
Figure 10B:
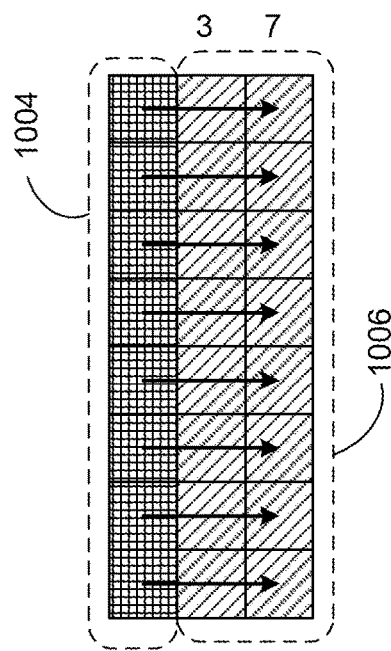
Figure 10A:
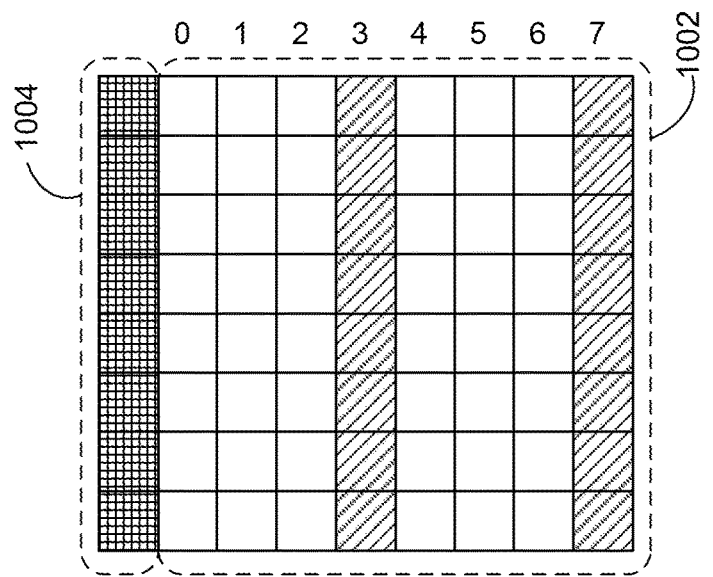

MDS-IP implementations may be applied in a vertical mode (e.g., a transposed version of FIG. 9), where vertical downsampling may be performed to retain half of the pixel rows, the first half of the pixel rows may be predicted and coded, and vertical interpolation based on the reconstructed rows may be performed to predict the second half of the pixel rows. FIG. 10 is a diagram illustrating an example vertical mode downsampling and prediction process. FIG. 10(A) is a diagram illustrating an example an 8×8 block 1002. Pixels in rows 3 and 7 may be shaded to indicate the rows of pixels that may remain after subsampling. A top row of pixels 1004 may be a row of prediction pixels. FIG. 10(B) is a diagram illustrating an example the block after downsampling, which yields a block 1006 comprising rows 3 and 7. Pixels in these rows may be predicted and coded. FIG. 10(C) is a diagram illustrating an example of the interpolation of the upsampled pixels in rows 0, 1, 2, 4, 5, and 6. These rows may be interpolated from the top row of prediction pixels and reconstructed rows 3 and 7.

Along with horizontal and vertical prediction modes, MDS-IP may be applied to a variety of non-diagonal angular prediction modes (e.g., prediction modes with angles between 0° and 90° and prediction modes with angles between 90° and 180°). For example, the diagonal (e.g., along the 45° or 135° direction) prediction modes may include the diagonal down-left mode and the diagonal down-right mode (e.g., modes 3 and 4 in FIG. 3). Prediction modes in the diagonal direction may include VER−8, VER+8 and HOR−8 (e.g., modes 3, 6, and 9 in FIG. 5). FIGS. 11(A)-11(D) are diagrams illustrating an example of a MDS-IP process on an 8×8 block that is predicted using the diagonal downright mode. MDS-IP may be utilized for blocks of sizes other than 8×8, such as, but not limited to larger block sizes. In FIG. 11, the pixels in the left column and the pixels in the top row may be the prediction pixels from already coded neighboring blocks. The remaining pixels may be the pixels to be predicted. As shown by the diagonal arrows in FIG. 11(A), the shaded prediction pixels may be propagated along the diagonal direction.

Figure 11A:
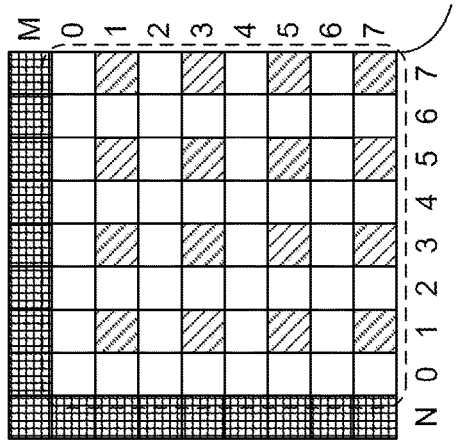
FIG. 11(A) is a diagram illustrating an example of a diagonal prediction mode.
Figure 11B:
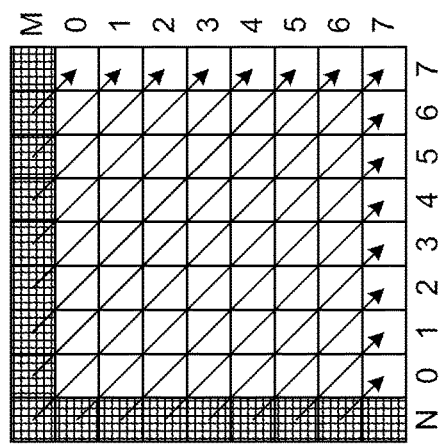
FIGS. 11(B)-11(D) are diagrams illustrating examples of a diagonal prediction mode interpolation and predicting process.
Figure 11D:
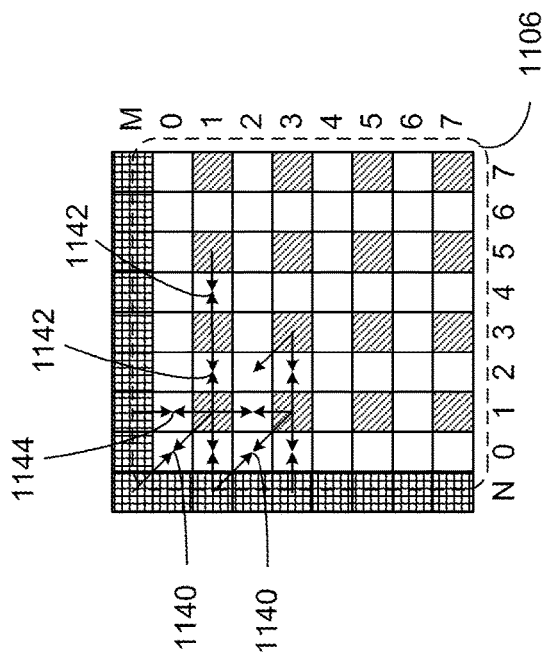
Figure 11C:
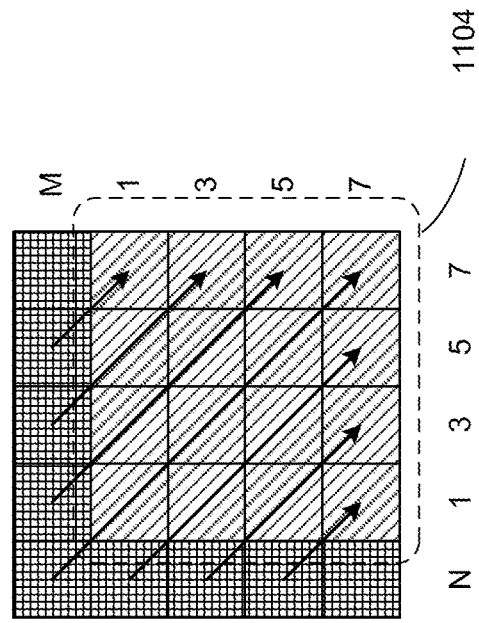

For angular prediction modes, the block may be downsampled in both dimensions. For example, as illustrated in FIGS. 11(B) and 11(C), an 8×8 block 1102 may be downsampled by a factor of 2 in each dimension and by pixels located at (2n+1,2m+1), n,m=0 . . . 3 to form a downsampled block 1104 in FIG. 11(C). These remaining pixels may be predicted in the diagonal direction, for example, as shown by the arrows in downsampled block 1104 in FIG. 11(C). Referring to FIGS. 8, 11(C), and 11(D), the prediction residual of the subsampled block may be coded following processing by units 832 and 834 and added back to the predicted subsampled block 812 to obtain the reconstructed subsampled block 814. Via the mode-dependent interpolation unit 844, the subsampled blocks comprising the remaining three quarters of the pixels may be predicted by interpolation from the already coded neighboring pixels and the reconstructed pixels at locations (2n+1, 2m+1), n,m=0 . . . 3. As described herein, various interpolation techniques associated with the various prediction modes may be used.

The subsampled blocks comprising the missing pixels may be predicted by interpolation at the same time, for example, as illustrated by FIG. 11(D). For example, the subblock comprising pixels at locations (2n, 2m), n,m=0 . . . 3, may be predicted by interpolation in the diagonal direction, for example, using the already reconstructed neighboring pixels and the reconstructed pixels at locations (2n+1, 2m+1), n,m=0 . . . 3, as shown by the arrows 1140 in FIG. 11(D). A portion (e.g., only a portion) of the arrows may be illustrated in FIG. 11(D). Interpolation along the diagonal direction may be used due to a higher pixel correlation existing in that direction. Other prediction modes may use different interpolation processes. The subblock comprising pixels at locations (2n, 2m+1), n,m=0 . . . 3, may be predicted by interpolation in the horizontal direction, for example, using the already reconstructed neighboring pixels and the reconstructed pixels at locations (2n+1, 2m+1), n,m=0 . . . 3, as shown by the arrows 1142 in FIG. 11(D). The subblock comprising pixels at locations (2n+1, 2m), n,m=0 . . . 3, may be predicted by interpolation in the vertical direction, for example, using the already reconstructed neighboring pixels and the reconstructed pixels at locations (2n+1, 2m+1), n,m=0 . . . 3, as shown by the arrows 1144 in FIG. 11(D).

Modifications may be made to the interpolation process, such as, but not limited to different interpolation filters with different filter tap lengths in the horizontal direction and/or the vertical direction may be used. After prediction, the prediction residual of the three subblocks comprising the missing pixels at locations (2n,2m), (2n,2m+1) and (2n+1, 2m), respectively, may be coded following processing by units 836 and 838 (e.g., FIG. 8), and added back to the prediction signal to obtain the three reconstructed subblocks comprising the missing pixels 818.

FIGS. 12(A)-12(D) are diagrams illustrating examples of a diagonal prediction mode interpolation and predicting process. Referring to FIG. 12, the subblocks comprising the missing pixels may be predicted and reconstructed in a cascaded (e.g., multi-stage) manner. Referring to FIGS. 12(A) and 12(B), an input block 1202 may be downsampled in two dimensions (e.g., with a 2:1 subsampling rate in both dimensions) to yield downsampled block 1204. The pixels which remain in the block after subsampling may be shaded in FIG. 12(A). The pixels in block 1204 may be intra predicted using any suitable intra prediction technique, for example, as indicated by the arrows in FIG. 12(B). As illustrated by block 1206 in FIG. 12(C), the pixels at locations (2n, 2m), n,m=0 . . . 3, may be predicted by interpolation in the diagonal direction (e.g., as shown by arrows 1220), for example, using the already reconstructed neighboring pixels and the reconstructed pixels at locations (2n+1,2m+1), n,m=0 . . . 3. The prediction residual of the subblock comprising samples at locations (2n, 2m), n,m=0 . . . 3, may be coded following the steps in 836 and 838 (e.g., FIG. 8). The reconstructed residual may be added back to the prediction to obtain the reconstructed subblock comprising pixels at locations (2n, 2m). For example, as shown by block 1208 in FIG. 12(D), the subblock comprising remaining pixels at locations (2n, 2m+1) and the subblock comprising remaining pixels at locations (2n+1, 2m) may be predicted by interpolation using the pixels that have been reconstructed, for example, using the arrows 1222 and using the arrows 1224, respectively.

FIG. 13 is a diagram illustrating an example of an interpolation technique. Input block 1302 in FIG. 13(A) may be downsampled in two directions to yield the downsampled block 1304 shown in FIG. 13(B). Various pixels may be shaded in FIG. 13(A) to show the pixels that remain after downsampling. The pixels in downsampled block 1304 may be predicted as indicated by the diagonal arrows in FIG. 13(B). Subsequent to reconstruction of the predicted pixels, the pixels at locations (2n, 2m) and the pixels at locations (2n, 2m+1) may be predicted by interpolation in the diagonal direction (e.g., arrows 1320) and in the horizontal direction (e.g., arrows 1324), respectively, for example, as shown in FIG. 13(C). The prediction residuals of the subblock comprising samples at locations (2n,2m) and the subblock comprising samples at locations (2n, 2m+1) may be coded following processing by units 836 and 838. The reconstructed residual may be added back to obtain the reconstructed subblock comprising pixels at locations (2n, 2m) and the reconstructed subblock comprising pixels locations (2n, 2m+1), respectively. For example, as shown by block 1308 in FIG. 13(D) where pixels at locations (2n, 2m), pixels at locations (2n, 2m+1), and pixels at locations (2n+1, 2m+1) may have been reconstructed, the remaining subblock comprising pixels at locations (2n+1, 2m) may be predicted in the diagonal direction (e.g., arrows 1326), and/or the residual may be coded following processing by units 836 and 838.

If missing pixels are predicted and reconstructed in a cascaded manner, one or more of the residual coding steps (e.g., as performed by units 836 and 838) may be by-passed if, for example, prediction is sufficiently accurate or computational complexity is sufficiently high. Whether one or more of such steps are by-passed may be decided by the encoder and signaled to the decoder in the bitstream, for example, by setting a coded_block_flag to 0. The encoder and the decoder may agree beforehand which (if any) steps may be by-passed. As described herein (e.g., FIG. 12(D)), following the prediction of pixels at locations (2n+1, 2m) and locations (2n, 2m+1) using arrows 1222 and 1224, the encoder and the decoder may finish the MDS-IP process for the input block, and the operations in units 836 and 838 may be by-passed. The interpolation processes may employ interpolation filters of different characteristics (e.g., different tap lengths and coefficients), such as but not limited to a bilinear filter, a 4-tap or 6-tap 1D filters, and/or a 4×4 or 6×6 2D non-separable filters.

Although MDS-IP processing may be described herein, similar processing techniques for other diagonal prediction modes may be performed. For example, both H.264/AVC and HEVC may support other directional prediction modes. These modes, because their prediction direction follows a finer angle, sub-pixel precision may be considered for prediction. The MDS-IP process for these prediction modes may utilize coding of a block of pixels with non-rectangular shapes. The MDS-IP process for these directional prediction modes may be turned off, using directional intra prediction for these modes. Transform of non-rectangular shapes (e.g., shape-adaptive DCT) and appropriate coefficient scanning may be applied to the MDS-IP processing for these prediction modes.

FIGS. 14(A)-(D) are diagrams illustrating an example of an interpolation technique for a non-diagonal angular prediction mode. Input block 1402 in FIG. 14(A) may be downsampled in more than one direction (e.g., two directions) to yield the downsampled block 1404 shown in FIG. 14(B). Various pixels may be shaded in FIG. 14(A) to show the pixels that remain after downsampling. The pixels in downsampled block 1404 may be predicted, for example, as indicated by the non-diagonal angular arrows in FIG. 14(B). The non-diagonal angular arrows may correspond to a non-45°/non-135° angular diagonal prediction mode. While a 4:1 subsampling rate (e.g., 2:1 in two directions) may be illustrated in FIG. 14, other subsampling rates may be used. For example, a 2:1 subsampling rate, a 6:1 subsampling rate, an 8:1 subsampling rate, or a variety of other suitable subsampling rates may be used. As illustrated by block 1406 in FIG. 14(C), the pixels at locations (2n, 2m), n,m=0 . . . 3 may be predicted by interpolation in the angular direction (e.g., as shown by arrows 1420) using the already reconstructed neighboring pixels at locations (2n−1, 2m−3) and the reconstructed pixels at locations (2n+1, 2m+3). The prediction residual of the subblock comprising samples at locations (2n, 2m), n,m=0 . . . 3, may be coded following the steps in 836 and 838 (e.g., FIG. 8). The reconstructed residual may be added back to the prediction to obtain the reconstructed subblock comprising pixels at locations (2n, 2m). As shown by block 1408 in FIG. 14(D), the subblock comprising the remaining pixels may be predicted by interpolation using the pixels that have been reconstructed (e.g., at locations (2n−1, 2m−2) and (2n+1, 2m+2), as indicated by arrows 1426).

Figure 15C:
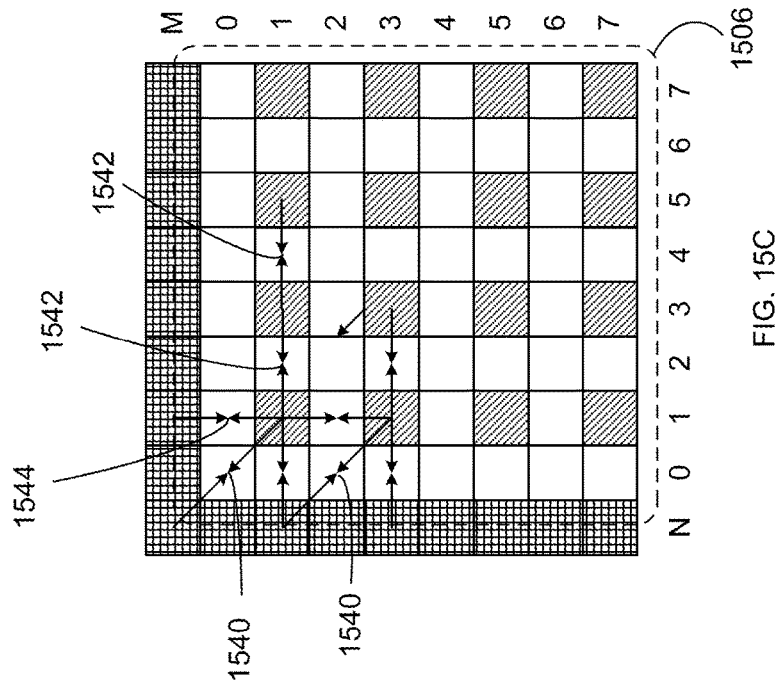
FIGS. 15(A)-15(C) are diagrams illustrating examples of a diagonal prediction mode interpolation and predicting process.
Figure 15A:
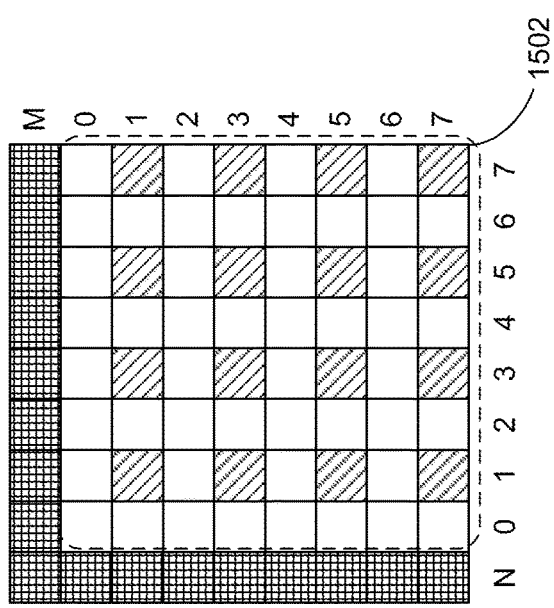
Figure 15B:
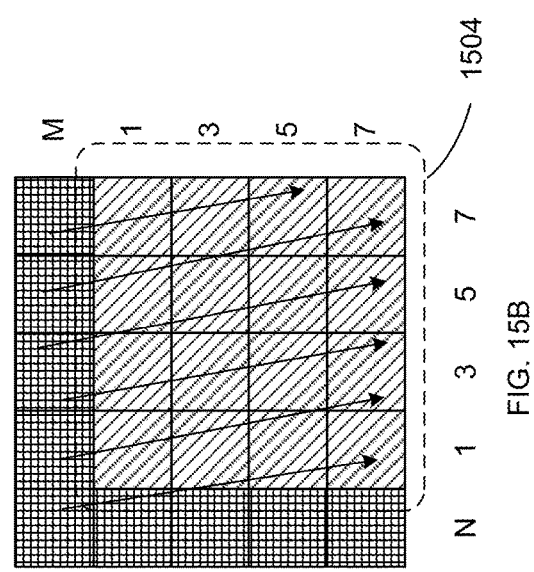

FIGS. 15(A)-(C) are diagrams illustrating an example of an MDS-IP process on an 8×8 block that is predicted using a non-diagonal angular prediction mode (e.g., non-45°/non-135°). A pixel weighting process may assist with the interpolation. While an 8×8 block may be shown in FIGS. 15(A)-(C), MDS-IP may be utilized for blocks having a variety of sizes. In FIG. 15, the pixels in the left column and the pixels in the top row may be the prediction pixels from already coded neighboring blocks. The block 1502 may be downsampled in both dimensions. For example, as illustrated in FIGS. 15(A) and 15(B), an 8×8 block 1502 may be downsampled by a factor of 2 in each dimension and pixels located at locations (2n+1,2m+1), n,m=0 . . . 3, may form a downsampled block 1504 in FIG. 15(B). These remaining pixels may be predicted in a non-diagonal angular direction, for example, as shown by the arrows in downsampled block 1504 in FIG. 15(B). Referring to FIGS. 8, 15(B), and 15(C), the prediction residual of the subsampled block may be coded following processing by units 832 and 834 and added back to the predicted subsampled block 812 to obtain the reconstructed subsampled block 814. Via the mode-dependent interpolation unit 844, the subsampled blocks comprising the remaining three quarters of the pixels may be predicted by interpolation from the reconstructed subsampled block 814. The subsampled blocks comprising the missing pixels may be predicted by interpolation at the same time using a weighting implementation, for example, as illustrated by FIG. 15(C). For example, the subblock comprising pixels at locations (2n, 2m), n,m=0 . . . 3, may be predicted by interpolation in the diagonal direction using the already reconstructed neighboring pixels and the reconstructed pixels at locations (2n+1, 2m+1), n,m=0 . . . 3, for example, as shown by block 1506 and arrows 1540. The interpolation process may weigh pixels differently. For example, the interpolation process may weigh the "upper left" pixel heavier than the "lower right" pixel. The particular weighting implementation may depend on the prediction mode utilized. For example, the "upper left" pixel may be given a 70% weighting factor while the "lower right" pixel may be given a weighting factor of 30%. The subblock comprising pixels at locations (2n,2m+1), n,m=0 . . . 3, may be predicted by interpolation in the horizontal direction, using the already reconstructed neighboring pixels and the reconstructed pixels at locations (2n+1, 2m+1), n,m=0 . . . 3, for example, as shown by arrows 1542 in FIG. 15(C). The "left" pixel and the "right" pixel may be given equal or different weighting factors. For example, the "left" pixel may be given a weighting of 55% while the "right" pixel may be given a weighting of 45%. The subblock comprising pixels at locations (2n+1, 2m), n,m=0 . . . 3, may be predicted by interpolation in the vertical direction using the already reconstructed neighboring pixels and the reconstructed pixels at locations (2n+1, 2m+1), n,m=0 . . . 3, for example, as shown by the arrows 1544 in FIG. 15(C). The "top" pixel and the "bottom" pixel may be given equal or different weighting factors. For example, the "top" pixel may be given a weighting of 60% while the "right" pixel may be given a weighting of 40%.

Modifications may be made to the interpolation process, such as, but not limited to, different weighting factors based on the prediction mode. After prediction, the prediction residual of the three subblocks comprising the missing pixels at locations (2n, 2m), (2n, 2m+1) and (2n+1, 2m), respectively, may be coded following processing by units 836 and 838 (FIG. 8), and may be added back to the prediction signal to obtain the three reconstructed subblocks comprising the missing pixels 818. The residual coding process for the missing pixels at locations (2n,2m), (2n,2m+1) and (2n+1, 2m) may be by-passed by the encoder and/or the decoder.

While exemplary interpolation techniques have been illustrated for horizontal, vertical, diagonal, and non-diagonal angular prediction modes, the MDS-IP implementations described herein may be used with a variety of video encoding and decoding prediction modes. The same interpolation technique or different interpolation techniques may be applied to the one or more sub blocks. The interpolation technique(s) may include one or more filters, which may be selected based on the prediction mode. For example, the interpolation filter may be a 4-tap one-dimensional filter, a 6-tap one-dimensional filter, a 4×4 two-dimensional filter, a 6×6 two-dimensional filter, among others. One or more interpolation filters may be applied along with one or more interpolation directions, which may be based on the prediction mode.

Figure 16A:
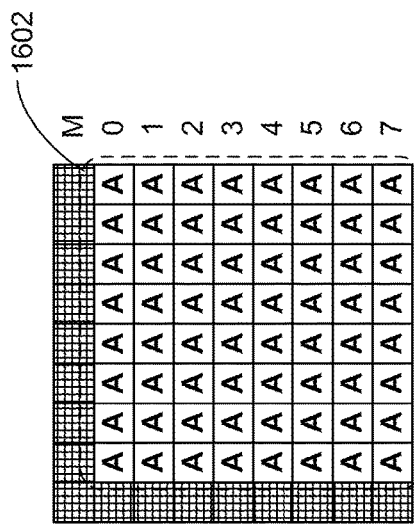
FIG. 16(A) is a diagram illustrating an example of a non-directional prediction mode.
Figure 16B:
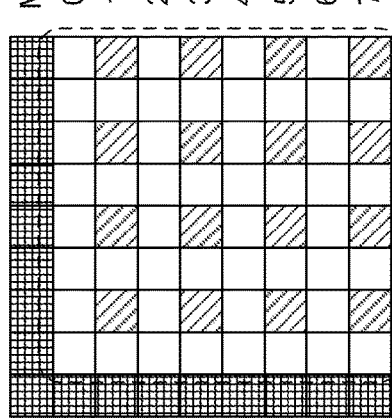
FIGS. 16(B)-16(D) are diagrams illustrating examples of a non-directional prediction mode interpolation and predicting process.
Figure 16C:
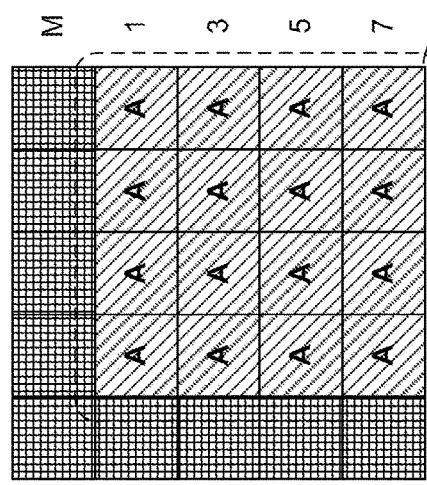
Figure 16D:
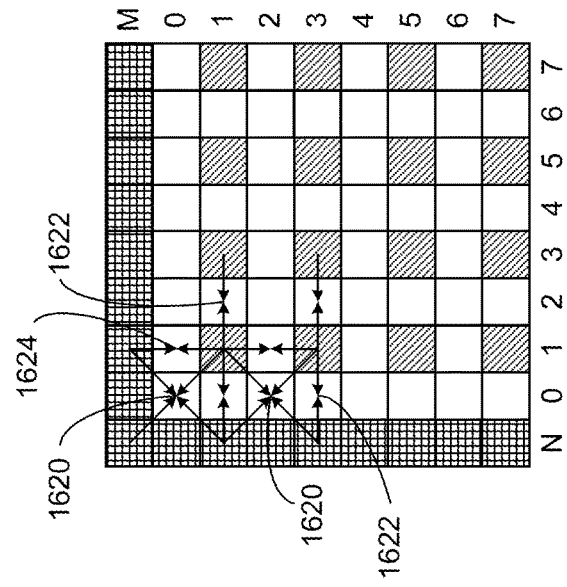

Non-directional prediction modes such as, but not limited to the DC mode and the planar prediction mode may be supported. The DC prediction may be performed by taking the average of the prediction pixels from already reconstructed neighboring blocks (e.g., the leftmost column and top column in FIG. 16(A), denoted as "A") and assigning the average value to the entire block to be predicted (e.g., an 8×8 block 1602 in FIG. 16(A)). The planar mode (e.g., as in HEVC HM3.0) may be described herein, for example, with reference to FIG. 6. Non-directional prediction modes may be suitable for flat areas or areas with slow/smooth gradients. FIGS. 16(A)-(D) and 17(A)-(D) are diagrams illustrating examples of MDS-IP processing applied on an 8×8 block predicted using a DC prediction mode. While an 8×8 block may be shown, MDS-IP may be used to process larger blocks. The block 1602 in FIG. 16(A) illustrates an example of a DC prediction implementation. FIGS. 16(B)-(D) illustrate examples of processing techniques according to implementations described herein.

For example, as shown in FIG. 16(B)-(C), the 8×8 block 1604 may be downsampled by a factor of 2 in each dimension to generate a 4×4 block 1606. Pixels located at locations (2n+1,2m+1), n,m=0 . . . 3, may be predicted by taking the average of the prediction pixels from already reconstructed neighboring blocks (e.g., the leftmost column and top column in FIG. 16(C)). The prediction residual of the subsampled block 822 (e.g., FIG. 8) may be coded following the processing by units 832 and 834 and may be added back to the predicted subsampled block 812 to obtain the reconstructed subsampled block 814. The subblocks comprising the remaining three quarters of the pixels may be predicted by interpolation from the already coded neighboring pixels and the reconstructed pixels at locations (2n+1, 2m+1), n,m=0 . . . 3.

Referring to FIG. 16(D), the missing pixels may be predicted by interpolation at the same time. For example, the subblock comprising pixels at locations (2n, 2m), n,m=0 . . . 3, may be predicted by interpolation using the already reconstructed neighboring pixels and the reconstructed pixels at locations (2n+1, 2m+1), n,m=0 . . . 3, (e.g., from the first step of MDS-IP) for example, as shown by arrows 1620. A portion of the arrows 1620 may be shown in FIG. 16(C). Interpolation indicated by the arrows 1620 may not possess any directionality (e.g., due to the non-directional prediction mode). An averaging of the four pixels may be sufficient. The subblock comprising pixels at locations (2n,2m+1), n,m=0 . . . 3, may predicted by interpolation in the horizontal direction, for example, using the already reconstructed neighboring pixels and the reconstructed pixels at locations (2n+1, 2m+1), n,m=0 . . . 3, as shown by arrows 1622 in FIG. 16(C). The subblock comprising pixels at locations (2n+1, 2m), n,m=0 . . . 3 may be predicted by interpolation in the vertical direction using the already reconstructed neighboring pixels and the reconstructed pixels at locations (2n+1, 2m+1), n,m=0 . . . 3, for example, as shown by arrows 1624 in FIG. 16(C).

Modifications may be made to the interpolation process, such as but not limited to using different interpolation filters with different filter tap lengths in the horizontal direction and/or the vertical direction. After prediction, the prediction residual of the subblocks comprising the missing pixels may be coded following the processing by units 836 and 838 and added back to the prediction of the subblocks comprising the missing pixels to obtain the reconstructed subblocks comprising the missing pixels 818.

Figure 17B:
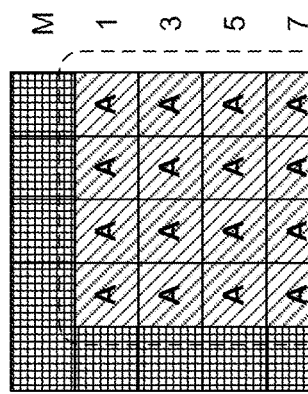
FIGS. 17(A)-17(D) are diagrams illustrating examples of a non-directional prediction mode interpolation and predicting process.
Figure 17A:
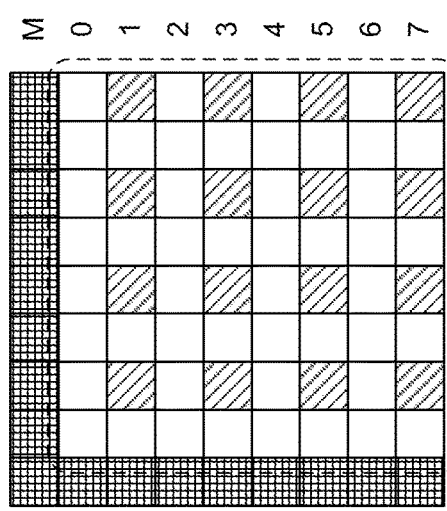
Figure 17D:
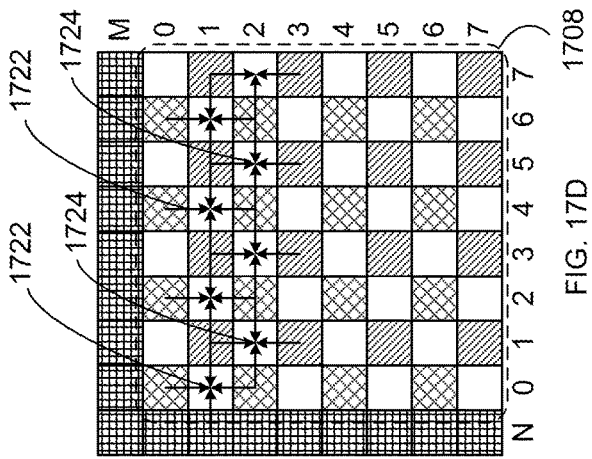

FIGS. 17A-D are diagrams illustrating an example of an interpolation implementation. Input block 1702 may be downsampled in two directions to yield downsampled block 1704 (e.g., which may be similar to block 1606 in FIG. 16(C)). The subblocks comprising the missing pixels may be predicted and reconstructed in a cascaded (e.g., multi-stage) manner. As indicated by arrows 1720 in FIG. 17(C), the pixels at locations (2n, 2m), n,m=0 . . . 3, may be predicted by interpolation (e.g., using simple averaging) using the already reconstructed neighboring pixels and the reconstructed pixels at locations (2n+1,2m+1), n,m=0 . . . 3. The prediction residual of the subblock comprising samples at locations (2n, 2m), n,m=0 . . . 3, may be coded following processing by units 836 and 838. The reconstructed residual may be added back to the prediction to obtain the reconstructed subblock comprising pixels at locations (2n, 2m). As shown in FIG. 17(D), the subblock comprising the remaining pixels at locations (2n, 2m+1) and the subblock comprising the remaining pixels at locations (2n+1, 2m) may be predicted by interpolation using pixels that may have been reconstructed, for example, using arrows 1722 and using arrows 1724, respectively.

Figure 17C:
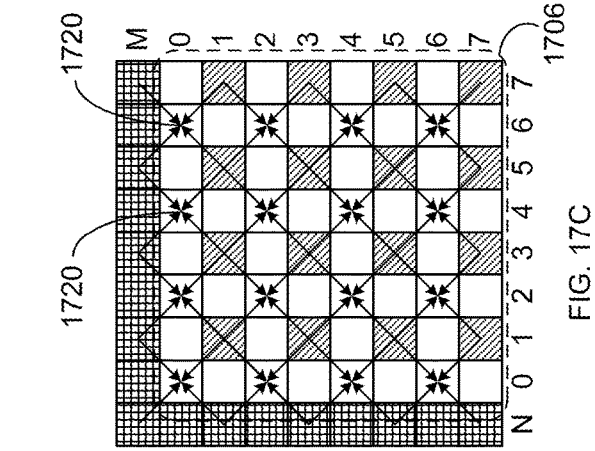

The interpolation processes in FIG. 16(C), FIG. 17(C), and FIG. 17(D) may employ interpolation filters of different characteristics (e.g., different tap lengths and coefficients), such as but not limited to a bilinear filter (e.g., simple averaging), 4-tap or 6-tap 1D filters, and/or 4×4 or 6×6 2D non-separable filters. Although MDS-IP implementations may be described herein using the DC prediction mode as an example, MDS-IP implementations for other non-directional prediction modes (e.g., the planar prediction mode) may be substantially similar.

MDS-IP may be applicable to a wide variety of prediction modes. While the specific MDS-IP implementations for different prediction modes may vary, they may generally comprise a two-step procedure. For example, in a first step, a subsampled block comprising a portion (e.g., a half or a quarter) of the pixels in the input video block may be generated by applying a mode-dependent subsampling process. The subsampled block may be predicted based on the prediction mode and the prediction residual of the subsampled block may be computed and coded to obtain the reconstructed residual. The reconstructed subsampled block may then be generated. For example, in a second step, the one or more subblocks comprising the remaining pixels in the input video block may be predicted by interpolating from already coded neighboring pixels and the reconstructed subsampled block previously generated. The specific interpolation process (e.g., interpolation filter, interpolation direction, etc.) may depend on the prediction mode. The prediction residual of the one or more subblocks comprising the remaining pixels in the input video block may be coded.

Figure 13B:
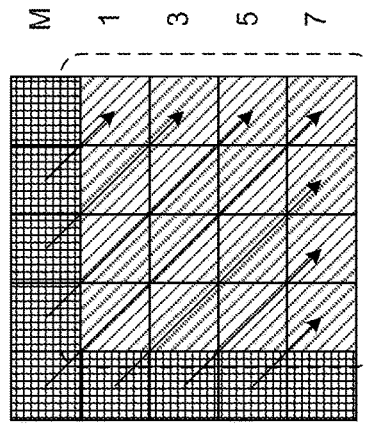
FIGS. 13(A)-13(D) are diagrams illustrating examples of a diagonal prediction mode interpolation and predicting process.
Figure 13D:
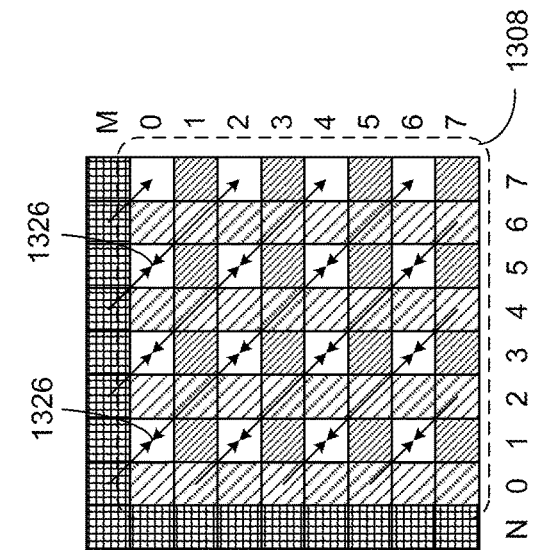
Figure 13A:
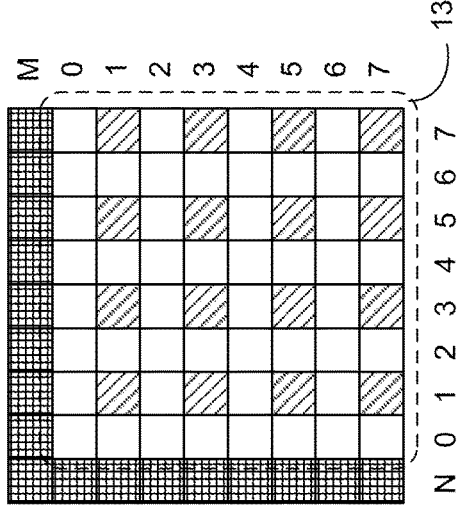
Figure 13C:
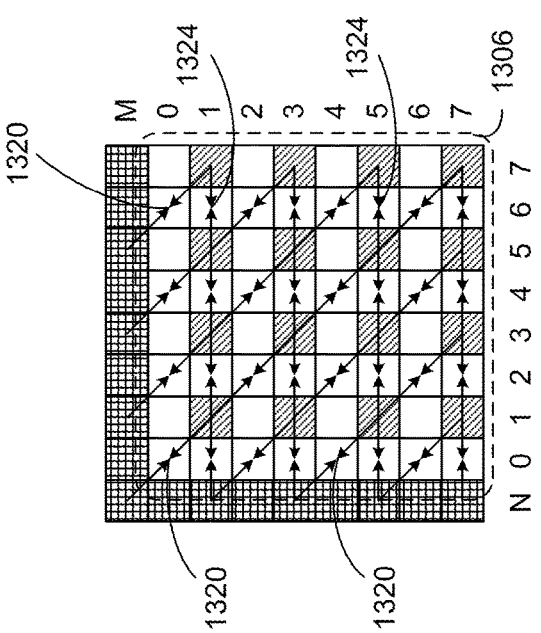
Figure 14A:
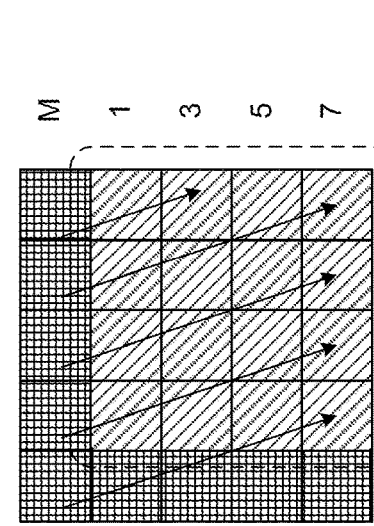
FIGS. 14(A)-14(D) are diagrams illustrating examples of a diagonal prediction mode interpolation and predicting process.
Figure 14B:
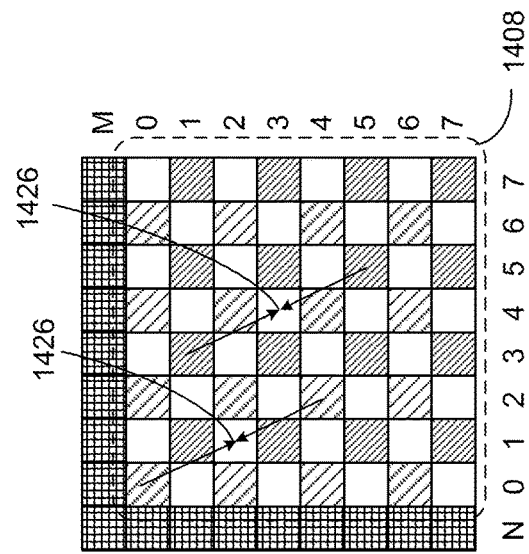
Figure 14C:
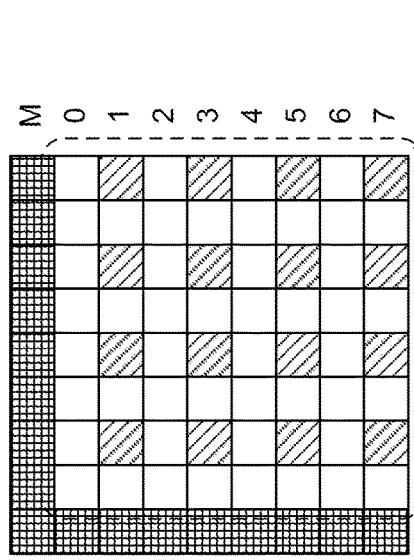
Figure 14D:
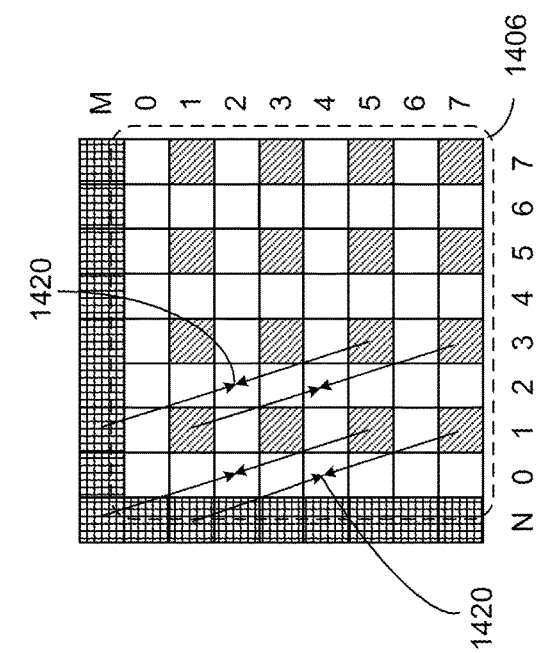

As described herein, the sub blocks comprising the missing pixels may be predicted and reconstructed in a cascaded (e.g., multi-stage) manner. For example, the pixels at a first location (e.g., locations (2n, 2m) with reference to FIG. 12) may be referred to as a first portion of reconstructed subblocks. The pixels at a second location (e.g., at locations (2n, 2m+1) and/or at locations (2n+1, 2m) with reference to FIG. 12) may be referred to as a second portion of reconstructed subblocks. A second portion of reconstructed subblocks may be generated based at least partially on a generated first portion of reconstructed subblocks (e.g., as shown in FIG. 12(D), FIG. 13(D), FIG. 14(D), etc.). The transformation and quantization parameters (e.g., a third set) used to generate the second portion of reconstructed subblocks may be the same as the set of transformation and quantization parameters used to generate the reconstructed residual of the subblock (e.g., the first set) or the transformation and quantization parameters used to generate the first portion of reconstructed subblocks (e.g., the second set).

Implementations may utilize various approaches for achieving the desired results. For example, one or more of the subsampled blocks (e.g., generated during the first and/or the second step of MDS-IP) may not be of square shape. 2D transform designed for the non-square shaped subsampled blocks, as well as appropriate coefficient scanning orders, may be designed and applied. Square-shaped 2D transform, as well as scanning order, may be applied to the non-square rectangular shaped subblocks.

The residual coding process in the first step of MDS-IP (e.g., units 832 and 834) and the residual coding process in the second step of MDS-IP (e.g., units 836 and 838) may or may not be the same. The same transform and quantization parameters or different transform and quantization parameters may be applied during these steps. One or more of the transform unit 104, quantization unit 106, inverse quantization unit 110, and inverse transform unit 112 (e.g., as shown in FIG. 1) may be used by the MDS-IP processing.

The mode-dependent interpolation process (e.g., as performed by mode-dependent interpolation unit 844) may generate a prediction signal for the one or more subsampled blocks comprising the missing samples, followed by the residual for the one or more subsampled blocks comprising the missing samples being reconstructed. Prediction and residual generation may be performed in a cascaded manner, for example, where a first portion of the one or more subblocks comprising the missing samples may be coded first, and then may be used to predict and code the second portion of the one or more subblocks comprising the missing samples.

The prediction residuals generated during the first step of the MDS-IP processing and the second step of the MDS-IP processing may be coded. At least some of the prediction residuals generated during the second step of MDS-IP may not be coded.

Figure 18:
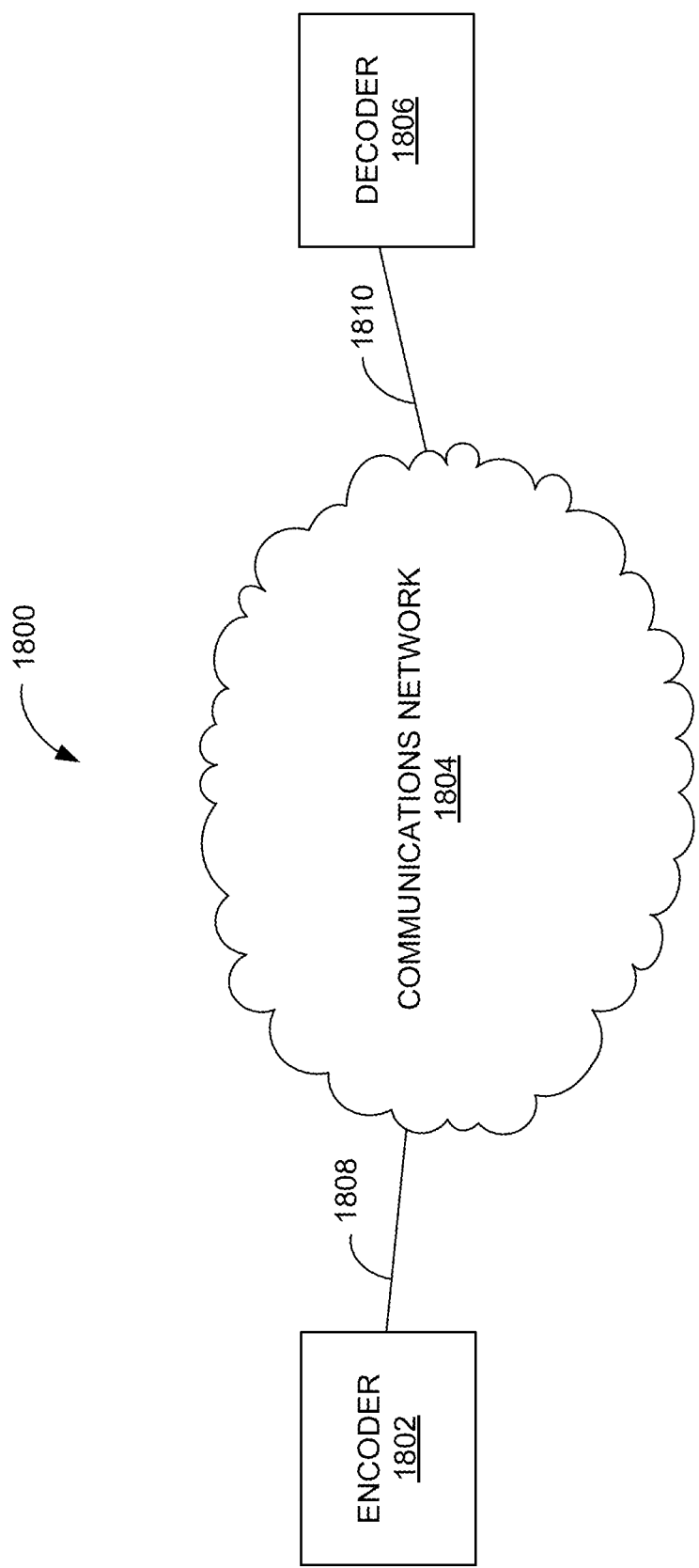
FIG. 18 is a diagram illustrating an example of a communication system.

FIG. 18 is a diagram illustrating an example of a communication system 1800. An encoder 1802 may be in communication with a communications network 1804 via a connection 1808. The encoder 1802 may utilize the MDS-IP processing as described herein. The connection 1808 may be a wireline connection or a wireless connection. A decoder 1806 may be in communication with the communications network 1806 via a connection 1810. The encoder 1806 may utilize the MDS-IP processing as described herein. The connection 1810 may be a wireline connection or a wireless connection. The communications network 1806 may be a suitable type of communication system, for example, as described herein. The encoder 1806 may be incorporated into any of a wide variety of terminals, such as, but not limited to, digital televisions, wireless communication devices, wireless broadcast systems, personal digital assistants (PDAs), laptop or desktop computers, tablet computers, digital cameras, digital recording devices, video gaming devices, video game consoles, cellular or satellite radio telephones, digital media players, and the like.

Figure 19A:
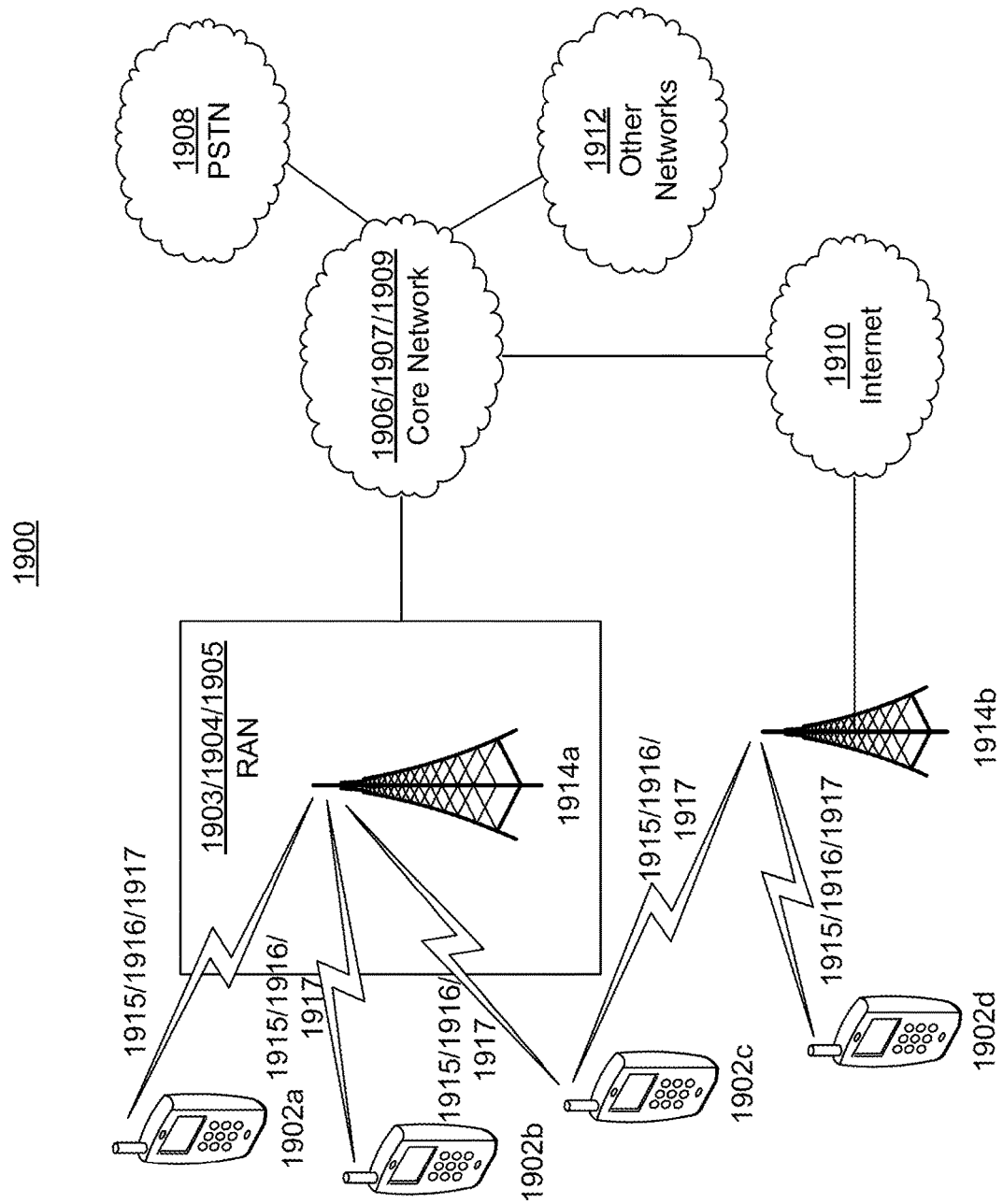
FIG. 19A is a system diagram of an example communications system in which one or more disclosed embodiments may be implemented.

FIG. 19A is a diagram of an example communications system 100 in which one or more disclosed embodiments may be implemented. The communications system 1900 may be a multiple access system that provides content, such as voice, data, video, messaging, broadcast, etc., to multiple wireless users. The communications system 1900 may enable multiple wireless users to access such content through the sharing of system resources, including wireless bandwidth. For example, the communications systems 1900 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 19A, the communications system 1900 may include wireless transmit/receive units (WTRUs) 1902a, 1902b, 1902c, 1902d, a radio access network (RAN) 1903/1904/1905, a core network 1906/1907/1909, a public switched telephone network (PSTN) 1908, the Internet 1910, and other networks 1912, though it will be appreciated that the disclosed embodiments contemplate any number of WTRUs, base stations, networks, and/or network elements. Each of the WTRUs 1902a, 1902b, 1902c, 1902d may be any type of device configured to operate and/or communicate in a wireless environment. By way of example, the WTRUs 1902a, 1902b, 1902c, 1902d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, or any other terminal capable of receiving and processing compressed video communications.

The communications systems 1900 may also include a base station 1914a and a base station 1914b. Each of the base stations 1914a, 1914b may be any type of device configured to wirelessly interface with at least one of the WTRUs 1902a, 1902b, 1902c, 1902d to facilitate access to one or more communication networks, such as the core network 1906/1907/1909, the Internet 1910, and/or the networks 1912. By way of example, the base stations 1914a, 1914b may be a base transceiver station (BTS), a Node-B, an eNode B, a Home Node B, a Home eNode B, a site controller, an access point (AP), a wireless router, and the like. While the base stations 1914a, 1914b are each depicted as a single element, it will be appreciated that the base stations 1914*a*, 1914*b* may include any number of interconnected base stations and/or network elements.

The base station 1914*a* may be part of the RAN 1903/1904/1905, which may also include other base stations and/or network elements (not shown), such as a base station controller (BSC), a radio network controller (RNC), relay nodes, etc. The base station 1914*a* and/or the base station 1914*b* may be configured to transmit and/or receive wireless signals within a particular geographic region, which may be referred to as a cell (not shown). The cell may further be divided into cell sectors. For example, the cell associated with the base station 1914*a* may be divided into three sectors. Thus, in one embodiment, the base station 1914*a* may include three transceivers, i.e., one for each sector of the cell. In another embodiment, the base station 1914*a* may employ multiple-input multiple output (MIMO) technology and, therefore, may utilize multiple transceivers for each sector of the cell.

The base stations 1914*a*, 1914*b* may communicate with one or more of the WTRUs 1902*a*, 1902*b*, 1902*c*, 1902*d* over an air interface 1915/1916/1917, which may be any suitable wireless communication link (e.g., radio frequency (RF), microwave, infrared (IR), ultraviolet (UV), visible light, etc.). The air interface 1915/1916/1917 may be established using any suitable radio access technology (RAT).

More specifically, as noted above, the communications system 1900 may be a multiple access system and may employ one or more channel access schemes, such as CDMA, TDMA, FDMA, OFDMA, SC-FDMA, and the like. For example, the base station 1914*a* in the RAN 1903/1904/1905 and the WTRUs 1902*a*, 1902*b*, 1902*c* may implement a radio technology such as Universal Mobile Telecommunications System (UMTS) Terrestrial Radio Access (UTRA), which may establish the air interface 1915/1916/1917 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1914*a* and the WTRUs 1902*a*, 1902*b*, 1902*c* may implement a radio technology such as Evolved UMTS Terrestrial Radio Access (E-UTRA), which may establish the air interface 1915/1916/1917 using Long Term Evolution (LTE) and/or LTE-Advanced (LTE-A).

In other embodiments, the base station 1914*a* and the WTRUs 1902*a*, 1902*b*, 1902*c* may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1914*b* in FIG. 19A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 1914*b* and the WTRUs 1902*c*, 1902*d* may implement a radio technology such as IEEE 802.11 to establish a wireless local area network (WLAN). In another embodiment, the base station 1914*b* and the WTRUs 1902*c*, 1902*d* may implement a radio technology such as IEEE 802.15 to establish a wireless personal area network (WPAN). In yet another embodiment, the base station 1914*b* and the WTRUs 1902*c*, 1902*d* may utilize a cellular-based RAT (e.g., WCDMA, CDMA2000, GSM, LTE, LTE-A, etc.) to establish a picocell or femtocell. As shown in FIG. 19A, the base station 1914*b* may have a direct connection to the Internet 1910. Thus, the base station 1914*b* may not be required to access the Internet 1910 via the core network 1906/1907/1909.

The RAN 1903/1904/1905 may be in communication with the core network 1906, which may be any type of network configured to provide voice, data, applications, and/or voice over internet protocol (VoIP) services to one or more of the WTRUs 1902*a*, 1902*b*, 1902*c*, 1902*d*. For example, the core network 1906/1907/1909 may provide call control, billing services, mobile location-based services, pre-paid calling, Internet connectivity, video distribution, etc., and/or perform high-level security functions, such as user authentication. Although not shown in FIG. 19A, it will be appreciated that the RAN 1903/1904/1905 and/or the core network 1906/1907/1909 may be in direct or indirect communication with other RANs that employ the same RAT as the RAN 1903/1904/1905 or a different RAT. For example, in addition to being connected to the RAN 1903/1904/1905, which may be utilizing an E-UTRA radio technology, the core network 1906/1907/1909 may also be in communication with another RAN (not shown) employing a GSM radio technology.

The core network 1906/1907/1909 may also serve as a gateway for the WTRUs 1902*a*, 1902*b*, 1902*c*, 1902*d* to access the PSTN 1908, the Internet 1910, and/or other networks 1912. The PSTN 1908 may include circuit-switched telephone networks that provide plain old telephone service (POTS). The Internet 1910 may include a global system of interconnected computer networks and devices that use common communication protocols, such as the transmission control protocol (TCP), user datagram protocol (UDP) and the internet protocol (IP) in the TCP/IP internet protocol suite. The networks 1912 may include wired or wireless communications networks owned and/or operated by other service providers. For example, the networks 1912 may include another core network connected to one or more RANs, which may employ the same RAT as the RAN 1903/1904/1905 or a different RAT.

Some or all of the WTRUs 1902*a*, 1902*b*, 1902*c*, 1902*d* in the communications system 1900 may include multi-mode capabilities, i.e., the WTRUs 1902*a*, 1902*b*, 1902*c*, 1902*d* may include multiple transceivers for communicating with different wireless networks over different wireless links. For example, the WTRU 1902*c* shown in FIG. 19A may be configured to communicate with the base station 1914*a*, which may employ a cellular-based radio technology, and with the base station 1914*b*, which may employ an IEEE 802 radio technology.

Figure 19B:
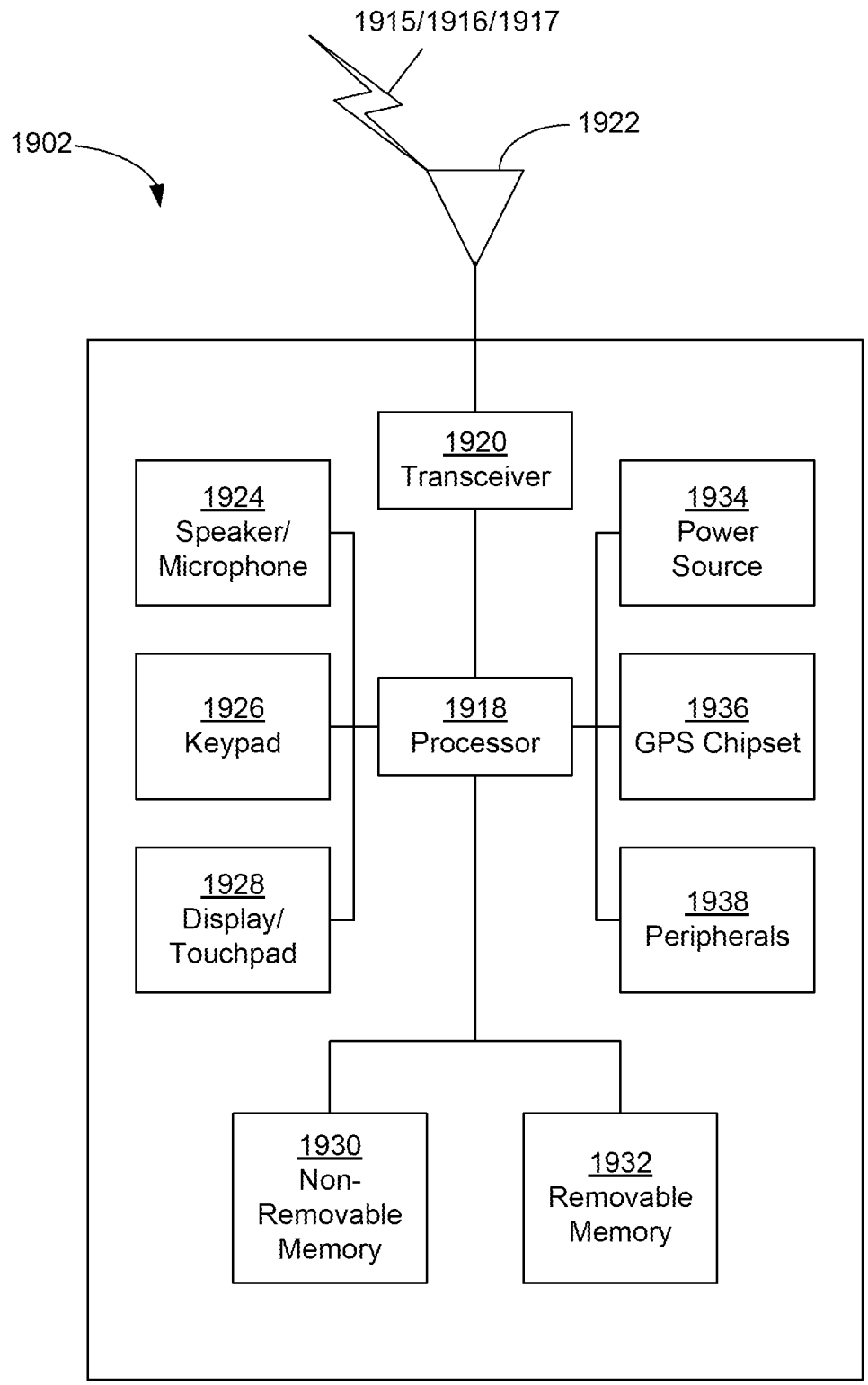
FIG. 19B is a system diagram of an example wireless transmit/receive unit (WTRU) that may be used within the communications system illustrated in FIG. 19A.

FIG. 19B is a system diagram of an example WTRU 1902. As shown in FIG. 19B, the WTRU 1902 may include a processor 1918, a transceiver 1920, a transmit/receive element 1922, a speaker/microphone 1924, a keypad 1926, a display/touchpad 1928, non-removable memory 1906, removable memory 1932, a power source 1934, a global positioning system (GPS) chipset 1936, and other peripherals 1938. It will be appreciated that the WTRU 1902 may include any sub-combination of the foregoing elements while remaining consistent with an embodiment. Also, embodiments contemplate that the base stations 1914*a* and 1914*b*, and/or the nodes that base stations 1914*a* and 1914*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 1918 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1918 may perform signal coding, data processing, power control, input/output processing, and/or any other functionality that enables the WTRU 1902 to operate in a wireless environment. The processor 1918 may be coupled to the transceiver 1920, which may be coupled to the transmit/receive element 1922. While FIG. 19B depicts the processor 1918 and the transceiver 1920 as separate components, it will be appreciated that the processor 1918 and the transceiver 1920 may be integrated together in an electronic package or chip.

The transmit/receive element 1922 may be configured to transmit signals to, or receive signals from, a base station (e.g., the base station 1914a) over the air interface 1915/1916/1917. For example, in one embodiment, the transmit/receive element 1922 may be an antenna configured to transmit and/or receive RF signals. In another embodiment, the transmit/receive element 1922 may be an emitter/detector configured to transmit and/or receive IR, UV, or visible light signals, for example. In yet another embodiment, the transmit/receive element 1922 may be configured to transmit and receive both RF and light signals. It will be appreciated that the transmit/receive element 1922 may be configured to transmit and/or receive any combination of wireless signals.

In addition, although the transmit/receive element 1922 is depicted in FIG. 19B as a single element, the WTRU 1902 may include any number of transmit/receive elements 1922. More specifically, the WTRU 1902 may employ MIMO technology. Thus, in one embodiment, the WTRU 1902 may include two or more transmit/receive elements 1922 (e.g., multiple antennas) for transmitting and receiving wireless signals over the air interface 1915/1916/1917.

The transceiver 1920 may be configured to modulate the signals that are to be transmitted by the transmit/receive element 1922 and to demodulate the signals that are received by the transmit/receive element 1922. As noted above, the WTRU 1902 may have multi-mode capabilities. Thus, the transceiver 1920 may include multiple transceivers for enabling the WTRU 1902 to communicate via multiple RATs, such as UTRA and IEEE 802.11, for example.

The processor 1918 of the WTRU 1902 may be coupled to, and may receive user input data from, the speaker/microphone 1924, the keypad 1926, and/or the display/touchpad 1928 (e.g., a liquid crystal display (LCD) display unit or organic light-emitting diode (OLED) display unit). The processor 1918 may also output user data to the speaker/microphone 1924, the keypad 1926, and/or the display/touchpad 1928. In addition, the processor 1918 may access information from, and store data in, any type of suitable memory, such as the non-removable memory 1906 and/or the removable memory 1932. The non-removable memory 1906 may include random-access memory (RAM), read-only memory (ROM), a hard disk, or any other type of memory storage device. The removable memory 1932 may include a subscriber identity module (SIM) card, a memory stick, a secure digital (SD) memory card, and the like. In other embodiments, the processor 1918 may access information from, and store data in, memory that is not physically located on the WTRU 1902, such as on a server or a home computer (not shown).

The processor 1918 may receive power from the power source 1934, and may be configured to distribute and/or control the power to the other components in the WTRU 1902. The power source 1934 may be any suitable device for powering the WTRU 1902. For example, the power source 1934 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1918 may also be coupled to the GPS chipset 1936, which may be configured to provide location information (e.g., longitude and latitude) regarding the current location of the WTRU 1902. In addition to, or in lieu of, the information from the GPS chipset 1936, the WTRU 1902 may receive location information over the air interface 1915/1916/1917 from a base station (e.g., base stations 1914a, 1914b) and/or determine its location based on the timing of the signals being received from two or more nearby base stations. It will be appreciated that the WTRU 1902 may acquire location information by way of any suitable location-determination method while remaining consistent with an embodiment.

The processor 1918 may further be coupled to other peripherals 1938, which may include one or more software and/or hardware modules that provide additional features, functionality and/or wired or wireless connectivity. For example, the peripherals 1938 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 19C:
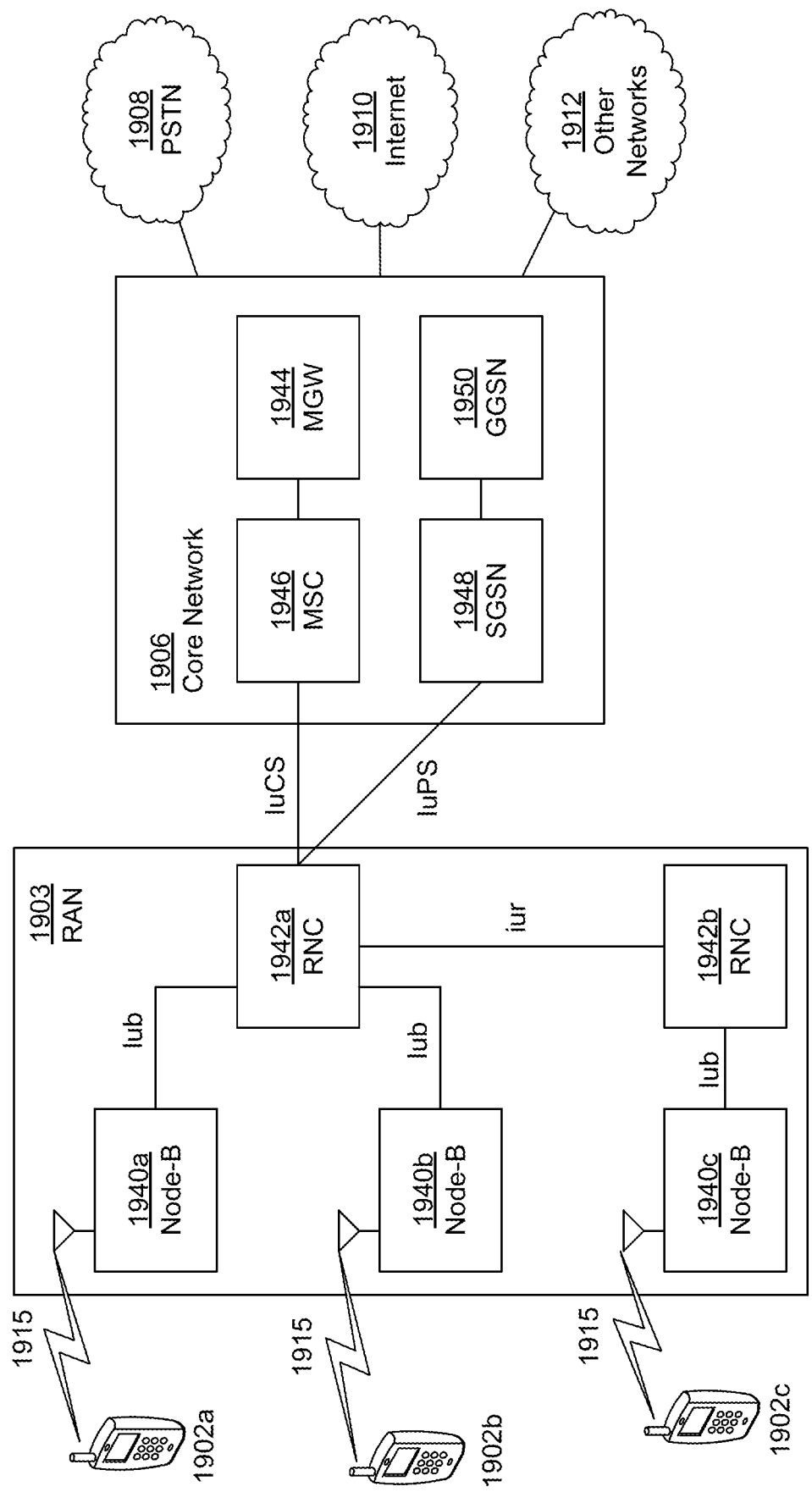
FIGS. 19C, 19D, and 19E are system diagrams of example radio access networks and example core networks that may be used within the communications system illustrated in FIG. 19A.

FIG. 19C is a system diagram of the RAN 1903 and the core network 1906 according to an embodiment. As noted above, the RAN 1903 may employ a UTRA radio technology to communicate with the WTRUs 1902a, 1902b, 1902c over the air interface 1915. The RAN 1904 may also be in communication with the core network 1906. As shown in FIG. 19C, the RAN 1903 may include Node-Bs 1940a, 1940b, 1940c, which may each include one or more transceivers for communicating with the WTRUs 1902a, 1902b, 1902c over the air interface 1915. The Node-Bs 1940a, 1940b, 1940c may each be associated with a particular cell (not shown) within the RAN 1903. The RAN 1903 may also include RNCs 1942a, 1942b. It will be appreciated that the RAN 1903 may include any number of Node-Bs and RNCs while remaining consistent with an embodiment.

As shown in FIG. 19C, the Node-Bs 1940a, 1940b may be in communication with the RNC 1942a. Additionally, the Node-B 1940c may be in communication with the RNC 1942b. The Node-Bs 1940a, 1940b, 1940c may communicate with the respective RNCs 1942a, 1942b via an Iub interface. The RNCs 1942a, 1942b may be in communication with one another via an Iur interface. Each of the RNCs 1942a, 1942b may be configured to control the respective Node-Bs 1940a, 1940b, 1940c to which it is connected. In addition, each of the RNCs 1942a, 1942b may be configured to carry out or support other functionality, such as outer loop power control, load control, admission control, packet scheduling, handover control, macrodiversity, security functions, data encryption, and the like.

The core network 1906 shown in FIG. 19C may include a media gateway (MGW) 1944, a mobile switching center (MSC) 1946, a serving GPRS support node (SGSN) 1948, and/or a gateway GPRS support node (GGSN) 1950. While each of the foregoing elements are depicted as part of the core network 1906, it will be appreciated that any one of these elements may be owned and/or operated by an entity other than the core network operator.

The RNC 1942*a* in the RAN 1903 may be connected to the MSC 1946 in the core network 1906 via an IuCS interface. The MSC 1946 may be connected to the MGW 1944. The MSC 1946 and the MGW 1944 may provide the WTRUs 1902*a*, 1902*b*, 1902*c* with access to circuit-switched networks, such as the PSTN 1908, to facilitate communications between the WTRUs 1902*a*, 1902*b*, 1902*c* and traditional land-line communications devices.

The RNC 1942*a* in the RAN 1903 may also be connected to the SGSN 1948 in the core network 1906 via an IuPS interface. The SGSN 1948 may be connected to the GGSN 1950. The SGSN 1948 and the GGSN 1950 may provide the WTRUs 1902*a*, 1902*b*, 1902*c* with access to packet-switched networks, such as the Internet 1910, to facilitate communications between and the WTRUs 1902*a*, 1902*b*, 1902*c* and IP-enabled devices.

As noted above, the core network 1906 may also be connected to the networks 1912, which may include other wired or wireless networks that are owned and/or operated by other service providers.

Figure 19D:
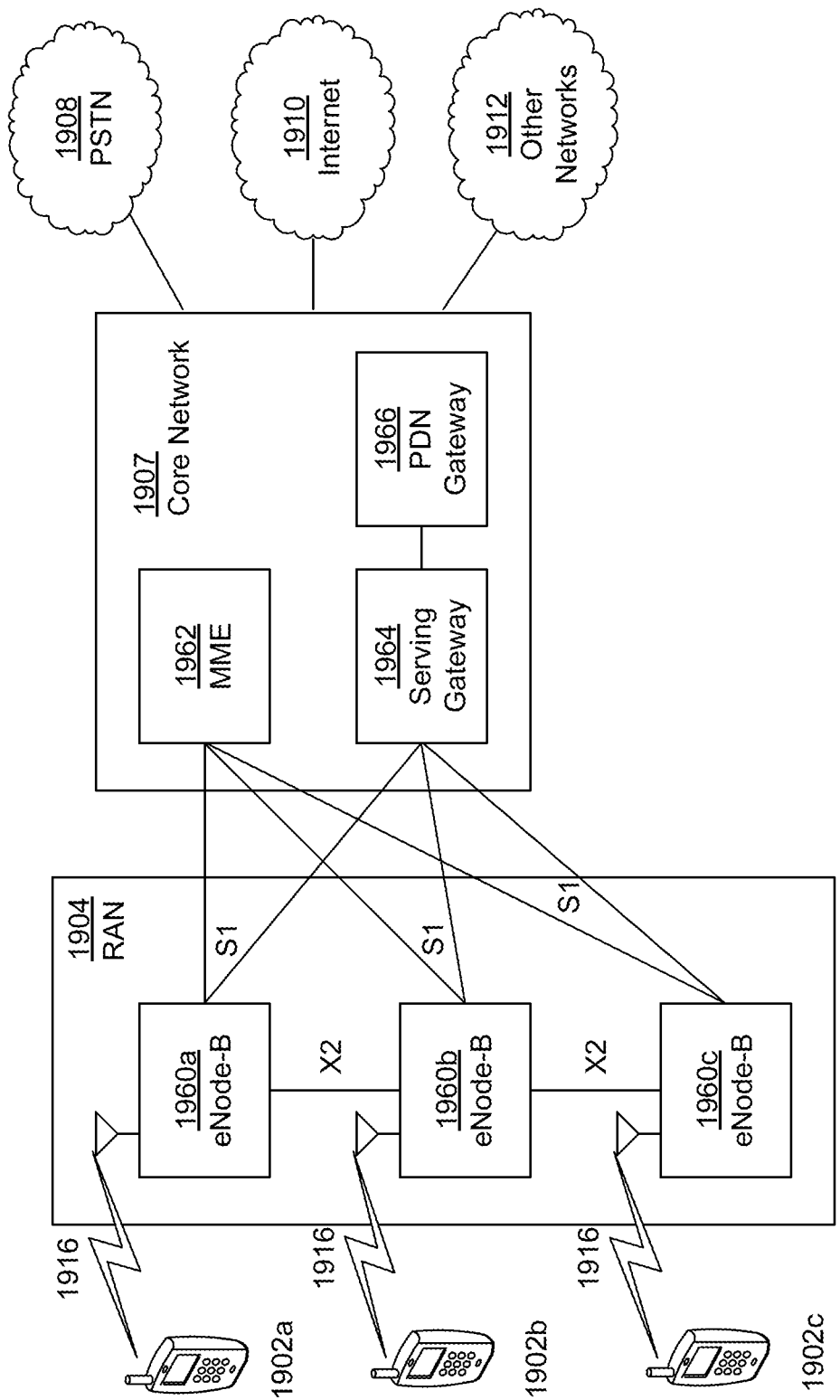

FIG. 19D is a system diagram of the RAN 1904 and the core network 1907 according to another embodiment. As noted above, the RAN 1904 may employ an E-UTRA radio technology to communicate with the WTRUs 1902*a*, 1902*b*, 1902*c* over the air interface 1916. The RAN 1904 may also be in communication with the core network 1907.

The RAN 1904 may include eNode-Bs 1960*a*, 1960*b*, 1960*c*, though it will be appreciated that the RAN 1904 may include any number of eNode-Bs while remaining consistent with an embodiment. The eNode-Bs 1960*a*, 1960*b*, 1960*c* may each include one or more transceivers for communicating with the WTRUs 1902*a*, 1902*b*, 1902*c* over the air interface 1916. In one embodiment, the eNode-Bs 1960*a*, 1960*b*, 1960*c* may implement MIMO technology. Thus, the eNode-B 1960*a*, for example, may use multiple antennas to transmit wireless signals to, and receive wireless signals from, the WTRU 1902*a*.

Each of the eNode-Bs 1960*a*, 1960*b*, 1960*c* may be associated with a particular cell (not shown) and may be configured to handle radio resource management decisions, handover decisions, scheduling of users in the uplink and/or downlink, and the like. As shown in FIG. 19D, the eNode-Bs 1960*a*, 1960*b*, 1960*c* may communicate with one another over an X2 interface.

The core network 1907 shown in FIG. 19D may include a mobility management gateway (MME) 1962, a serving gateway 1964, and a packet data network (PDN) gateway 1966. While each of the foregoing elements are depicted as part of the core network 1907, it will be appreciated that any one of these elements may be owned and/or operated by an entity other than the core network operator.

The MME 1962 may be connected to each of the eNode-Bs 1960*a*, 1960*b*, 1960*c* in the RAN 1904 via an S1 interface and may serve as a control node. For example, the MME 1962 may be responsible for authenticating users of the WTRUs 1902*a*, 1902*b*, 1902*c*, bearer activation/deactivation, selecting a particular serving gateway during an initial attach of the WTRUs 1902*a*, 1902*b*, 1902*c*, and the like. The MME 1962 may also provide a control plane function for switching between the RAN 1904 and other RANs (not shown) that employ other radio technologies, such as GSM or WCDMA.

The serving gateway 1964 may be connected to each of the eNode Bs 1960*a*, 1960*b*, 1960*c* in the RAN 1904 via the S1 interface. The serving gateway 1964 may generally route and forward user data packets to/from the WTRUs 1902*a*, 1902*b*, 1902*c*. The serving gateway 1964 may also perform other functions, such as anchoring user planes during inter-eNode B handovers, triggering paging when downlink data is available for the WTRUs 1902*a*, 1902*b*, 1902*c*, managing and storing contexts of the WTRUs 1902*a*, 1902*b*, 1902*c*, and the like.

The serving gateway 1964 may also be connected to the PDN gateway 1966, which may provide the WTRUs 1902*a*, 1902*b*, 1902*c* with access to packet-switched networks, such as the Internet 1910, to facilitate communications between the WTRUs 1902*a*, 1902*b*, 1902*c* and IP-enabled devices.

The core network 1907 may facilitate communications with other networks. For example, the core network 1907 may provide the WTRUs 1902*a*, 1902*b*, 102*c* with access to circuit-switched networks, such as the PSTN 1908, to facilitate communications between the WTRUs 1902*a*, 1902*b*, 1902*c* and traditional land-line communications devices. For example, the core network 1907 may include, or may communicate with, an IP gateway (e.g., an IP multimedia subsystem (IMS) server) that serves as an interface between the core network 1907 and the PSTN 1908. In addition, the core network 1907 may provide the WTRUs 1902*a*, 1902*b*, 1902*c* with access to the networks 1912, which may include other wired or wireless networks that are owned and/or operated by other service providers.

Figure 19E:
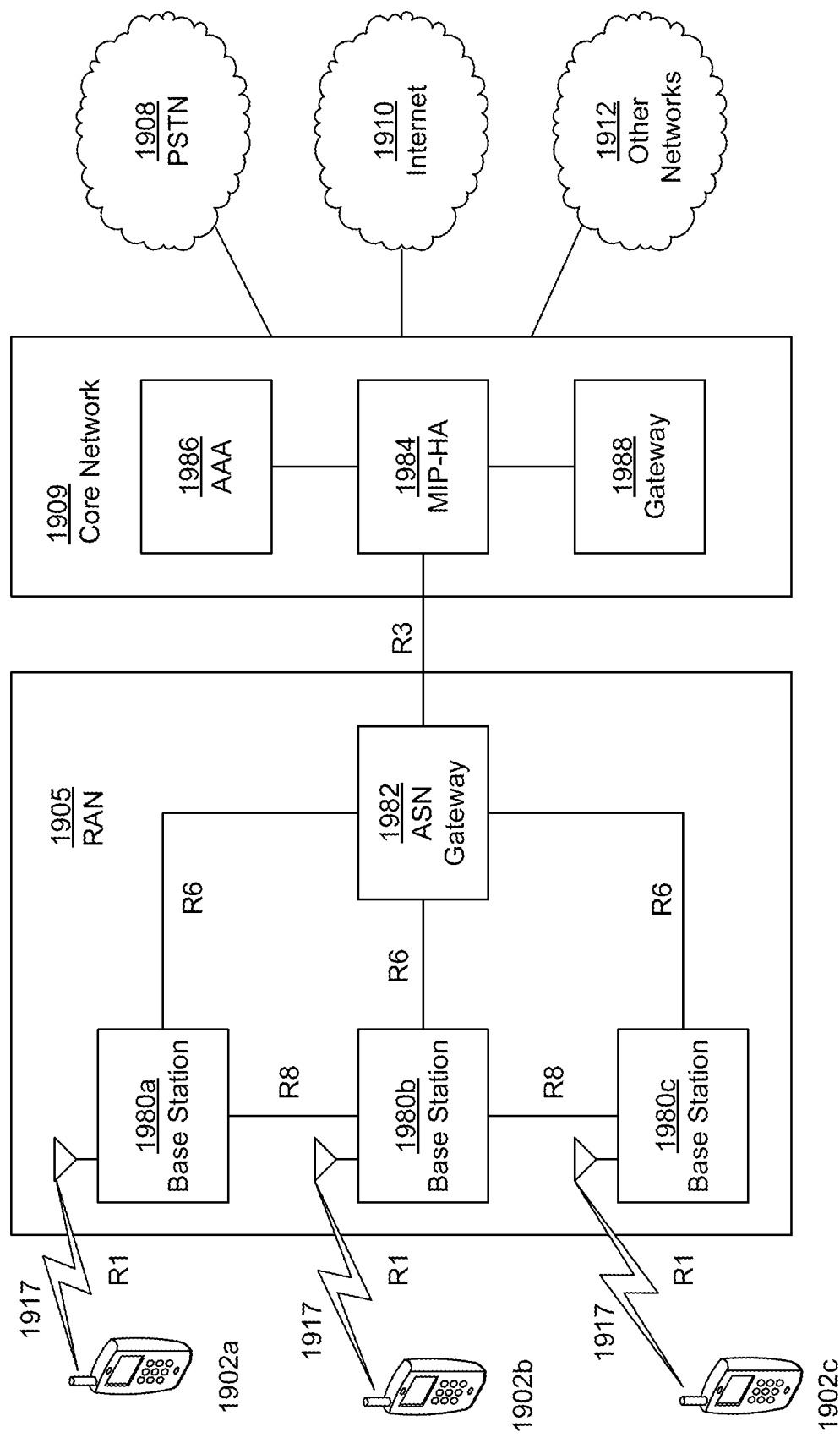

FIG. 19E is a system diagram of the RAN 1905 and the core network 1909 according to another embodiment. The RAN 1905 may be an access service network (ASN) that employs IEEE 802.16 radio technology to communicate with the WTRUs 1902*a*, 1902*b*, 1902*c* over the air interface 1917. As will be further discussed below, the communication links between the different functional entities of the WTRUs 1902*a*, 1902*b*, 1902*c*, the RAN 1905, and the core network 1909 may be defined as reference points.

As shown in FIG. 19E, the RAN 1905 may include base stations 1980*a*, 1980*b*, 1980*c*, and an ASN gateway 1982, though it will be appreciated that the RAN 1905 may include any number of base stations and ASN gateways while remaining consistent with an embodiment. The base stations 1980*a*, 1980*b*, 1980*c* may each be associated with a particular cell (not shown) in the RAN 1905 and may each include one or more transceivers for communicating with the WTRUs 1902*a*, 1902*b*, 1902*c* over the air interface 1917. In one embodiment, the base stations 1980*a*, 1980*b*, 1980*c* may implement MIMO technology. Thus, the base station 1980*a*, for example, may use multiple antennas to transmit wireless signals to, and receive wireless signals from, the WTRU 1902*a*. The base stations 1980*a*, 1980*b*, 1980*c* may also provide mobility management functions, such as handoff triggering, tunnel establishment, radio resource management, traffic classification, quality of service (QoS) policy enforcement, and the like. The ASN gateway 1982 may serve as a traffic aggregation point and may be responsible for paging, caching of subscriber profiles, routing to the core network 1909, and the like.

The air interface 1917 between the WTRUs 1902*a*, 1902*b*, 1902*c* and the RAN 1905 may be defined as an R1 reference point that implements the IEEE 802.16 specification. In addition, each of the WTRUs 1902*a*, 1902*b*, 1902*c* may establish a logical interface (not shown) with the core network 1909. The logical interface between the WTRUs 1902*a*, 1902*b*, 1902*c* and the core network 1909 may be defined as an R2 reference point, which may be used for authentication, authorization, IP host configuration management, and/or mobility management.

The communication link between each of the base stations 1980*a*, 1980*b*, 1980*c* may be defined as an R8 reference point that includes protocols for facilitating WTRU handovers and the transfer of data between base stations. The communication link between the base stations 190*a*, 1980*b*, 1980*c* and the ASN gateway 1982 may be defined as an R6 reference point. The R6 reference point may include protocols for facilitating mobility management based on mobility events associated with each of the WTRUs 1902*a*, 1902*b*, 1900*c*.

As shown in FIG. 19E, the RAN 1905 may be connected to the core network 1909. The communication link between the RAN 105 and the core network 1909 may defined as an R3 reference point that includes protocols for facilitating data transfer and mobility management capabilities, for example. The core network 1909 may include a mobile IP home agent (MIP-HA) 1984, an authentication, authorization, accounting (AAA) server 1986, and a gateway 1988, While each of the foregoing elements are depicted as part of the core network 1909, it will be appreciated that any one of these elements may be owned and/or operated by an entity other than the core network operator.

The MIP-HA 1984 may be responsible for IP address management, and may enable the WTRUs 1902*a*, 1902*b*, 1902*c* to roam between different ASNs and/or different core networks. The MIP-HA 1984 may provide the WTRUs 1902*a*, 1902*b*, 1902*c* with access to packet-switched networks, such as the Internet 1910, to facilitate communications between the WTRUs 1902*a*, 1902*b*, 1902*c* and IP-enabled devices. The AAA server 1986 may be responsible for user authentication and for supporting user services. The gateway 1988 may facilitate interworking with other networks. For example, the gateway 1988 may provide the WTRUs 1902*a*, 1902*b*, 1902*c* with access to circuit-switched networks, such as the PSTN 1908, to facilitate communications between the WTRUs 1902*a*, 1902*b*, 1902*c* and traditional land-line communications devices. In addition, the gateway 1988 may provide the WTRUs 1902*a*, 1902*b*, 1902*c* with access to the networks 1912, which may include other wired or wireless networks that are owned and/or operated by other service providers.

Although not shown in FIG. 19E, it will be appreciated that the RAN 1905 may be connected to other ASNs and the core network 1909 may be connected to other core networks. The communication link between the RAN 1905 the other ASNs may be defined as an R4 reference point, which may include protocols for coordinating the mobility of the WTRUs 1902*a*, 1902*b*, 1902*c* between the RAN 1905 and the other ASNs. The communication link between the core network 1909 and the other core networks may be defined as an R5 reference, which may include protocols for facilitating interworking between home core networks and visited core networks.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed is:

1. An apparatus for video decoding, comprising:
 a processor configured to:
 obtain intra prediction mode information associated with a video block;
 determine an intra prediction mode of a plurality of intra prediction modes based on the obtained intra prediction mode information;
 obtain a subsampled sub-block of the video block based on the determined intra prediction mode of the plurality of intra prediction modes, wherein the subsampled sub-block comprises pixels from two or more rows and two or more columns of the video block;
 obtain parameters associated with one or more remaining sub-blocks of the video block; and
 decode the one or more remaining sub-blocks of the video block based on the obtained subsampled sub-block, the determined intra prediction mode of the plurality of intra prediction modes, and the obtained parameters associated with the one or more remaining sub-blocks of the video block.

2. The apparatus of claim 1, wherein the intra prediction mode information comprises an intra prediction mode type.

3. The apparatus of claim 1, wherein the parameters associated with the one or more remaining sub-blocks of the video block are signaled in video data.

4. The apparatus of claim 1, wherein the parameters are further associated with the subsampled sub-block of the video block.

5. The apparatus of claim 1, wherein the subsampled sub-block and the one or more remaining sub-blocks are comprised in one picture.

6. The apparatus of claim 1, wherein the subsampled sub-block of the video block comprises luma samples.

7. The apparatus of claim 1, wherein the video block comprises chroma samples, the subsampled sub-block and the one or more remaining sub-blocks are comprised in one picture, and the processor is further configured to predict the one or more remaining sub-blocks of the video block based on the obtained subsampled sub-block, wherein the one or more remaining sub-blocks of the video block are decoded based on the prediction of the one or more remaining sub-blocks of the video block.

8. A method for video decoding, comprising:
 obtaining intra prediction mode information associated with a video block;
 determining an intra prediction mode of a plurality of intra prediction modes based on the obtained intra prediction mode information;
 obtaining a subsampled sub-block of the video block based on the determined intra prediction mode of the plurality of intra prediction modes, wherein the subsampled sub-block comprises pixels from two or more rows and two or more columns of the video block;
 obtaining parameters associated with one or more remaining sub-blocks of the video block; and
 decoding the one or more remaining sub-blocks of the video block based on the obtained subsampled sub-block, the determined intra prediction mode of the plurality of intra prediction modes, and the obtained parameters associated with the one or more remaining sub-blocks of the video block.

9. The method of claim 8, wherein the intra prediction mode information comprises an intra prediction mode type, and wherein the subsampled sub-block of the video block comprises luma samples.

10. The method of claim 8, wherein the parameters associated with the one or more remaining sub-blocks of the video block are signaled in video data.

11. The method of claim 8, wherein the parameters are further associated with the subsampled sub-block of the video block, and wherein the subsampled sub-block and the one or more remaining sub-blocks are comprised in one picture.

12. The method of claim 8, wherein the video block comprises chroma samples, the subsampled sub-block and the one or more remaining sub-blocks are comprised in one picture, and the method further comprises predicting the one or more remaining sub-blocks of the video block based on the obtained subsampled sub-block, wherein the one or more remaining sub-blocks of the video block are decoded based on the prediction of the one or more remaining sub-blocks of the video block.

13. An apparatus for video encoding, comprising:
a processor configured to:
determine an intra prediction mode of a plurality of intra prediction modes;
obtain a subsampled sub-block of a video block based on the determined intra prediction mode of the plurality of intra prediction modes, wherein the subsampled sub-block comprises pixels from two or more rows and two or more columns of the video block;
obtain parameters associated with one or more remaining sub-blocks of the video block; and
encode the one or more remaining sub-blocks of the video block based on the obtained subsampled sub-block, the determined intra prediction mode of the plurality of intra prediction modes, and the obtained parameters associated with the one or more remaining sub-blocks of the video block.

14. The apparatus of claim 13, wherein the subsampled sub-block of the video block comprises luma samples.

15. The apparatus of claim 13, wherein the parameters are further associated with the subsampled sub-block of the video block, and wherein the subsampled sub-block and the one or more remaining sub-blocks are comprised in one picture.

16. The apparatus of claim 13, wherein the video block comprises chroma samples, the subsampled sub-block and the one or more remaining sub-blocks are comprised in one picture, and the processor is further configured to predict the one or more remaining sub-blocks of the video block based on the obtained subsampled sub-block, wherein the one or more remaining sub-blocks of the video block are encoded based on the prediction of the one or more remaining sub-blocks of the video block.

17. A method for video encoding, comprising:
determining an intra prediction mode of a plurality of intra prediction modes;
obtaining a subsampled sub-block of a video block based on the determined intra prediction mode of the plurality of intra prediction modes, wherein the subsampled sub-block comprises pixels from two or more rows and two or more columns of the video block;
obtaining parameters associated with one or more remaining sub-blocks of the video block; and
encoding the one or more remaining sub-blocks of the video block based on the obtained subsampled sub-block, the determined intra prediction mode of the plurality of intra prediction modes, and the obtained parameters associated with the one or more remaining sub-blocks of the video block.

18. The method of claim 17, wherein the subsampled sub-block of the video block comprises luma samples.

19. The method of claim 17, wherein the parameters are further associated with the subsampled sub-block of the video block, and wherein the subsampled sub-block and the one or more remaining sub-blocks are comprised in one picture.

20. The method of claim 17, wherein the video block comprises chroma samples, the subsampled sub-block and the one or more remaining sub-blocks are comprised in one picture, and the method further comprises predicting the one or more remaining sub-blocks of the video block based on the obtained subsampled sub-block, wherein the one or more remaining sub-blocks of the video block are encoded based on the prediction of the one or more remaining sub-blocks of the video block.

* * * * *